United States Patent
Shimizu et al.

(10) Patent No.: US 7,157,015 B2
(45) Date of Patent: Jan. 2, 2007

(54) METHOD OF MANUFACTURING A SUBSTRATE WITH CONCAVE PORTIONS, A SUBSTRATE WITH CONCAVE PORTIONS, A SUBSTRATE WITH CONCAVE PORTIONS FOR MICROLENSES, A MICROLENS SUBSTRATE, A TRANSMISSION SCREEN AND A REAR PROJECTOR

(75) Inventors: Nobuo Shimizu, Suwa (JP); Hideto Yamashita, Suwa (JP)

(73) Assignee: Seiko Epson Corporation (JP)

( * ) Notice: Subject to any disclaimer, the term of this patent is extended or adjusted under 35 U.S.C. 154(b) by 213 days.

(21) Appl. No.: 10/764,606

(22) Filed: Jan. 23, 2004

(65) Prior Publication Data
US 2004/0211753 A1 Oct. 28, 2004

(30) Foreign Application Priority Data
Jan. 28, 2003 (JP) ............................. 2003-019589
May 21, 2003 (JP) ............................. 2003-144083

(51) Int. Cl.
*B29D 11/00* (2006.01)
(52) U.S. Cl. ............................ 216/24; 216/26; 216/96; 216/97
(58) Field of Classification Search ................ 216/24, 216/26, 96, 97
See application file for complete search history.

(56) References Cited

U.S. PATENT DOCUMENTS 4,012,263 A * 3/1977 Shell ............................. 501/70
5,593,528 A * 1/1997 Dings et al. ................. 156/154
5,876,267 A * 3/1999 Kanda ........................... 451/38
6,407,866 B1 * 6/2002 Yamashita et al. ........... 359/619
6,469,832 B1 * 10/2002 Yotsuya et al. .............. 359/619
6,618,200 B1 * 9/2003 Shimizu et al. .............. 359/619
2003/0007772 A1 * 1/2003 Borrelli et al. .............. 385/137

FOREIGN PATENT DOCUMENTS

| JP | 2000-131506 | 5/2000 |
|---|---|---|
| JP | 2001-039737 | 2/2001 |
| JP | 2001-341210 | 12/2001 |

OTHER PUBLICATIONS

Wolf et al., Silicon Processing for the VLSA Era, 1986, Lattice Press, vol. 1, pp. 532-533.*

* cited by examiner

*Primary Examiner*—Nadine Norton
*Assistant Examiner*—Binh X. Tran
(74) *Attorney, Agent, or Firm*—Harness, Dickey & Pierce, P.L.C.

(57) ABSTRACT

A method of manufacturing a substrate 5 with a plurality of concave portions 3 according to the invention includes the steps of forming a mask 6 on the substrate 5, forming a plurality of initial holes 61 on the mask 6 by means of a physical method such as blast processing or irradiation with laser beams, and forming the plurality of concave portions in the substrate 5 by subjecting the mask 6 with the plurality of initial holes 61 to an etching process. In case of carrying out the blast processing, glass beads whose average diameter is in the range of 50 to 100 μm are used as blast media.

15 Claims, 17 Drawing Sheets

(c)

(d)

(g)

(h)

(a)

(b)

(c)

METHOD OF MANUFACTURING A SUBSTRATE WITH CONCAVE PORTIONS, A SUBSTRATE WITH CONCAVE PORTIONS, A SUBSTRATE WITH CONCAVE PORTIONS FOR MICROLENSES, A MICROLENS SUBSTRATE, A TRANSMISSION SCREEN AND A REAR PROJECTOR

FIELD OF THE INVENTION

The present invention relates to a method of manufacturing a substrate with concave portions, a substrate with concave portions, a substrate with concave portions for microlenses, a microlens substrate, a transmission screen and a rear projector.

BACKGROUND OF THE INVENTION

In recent years, demand for a rear projector is becoming increasingly strong as a suitable display for a monitor for a home theater, a large screen television, or the like.

In a transmission screen used for the rear projector, a lenticular lens is in general use. However, this type of screen has a problem that the vertical view angle thereof is small although the lateral view angle thereof is large (namely, there is a bias in the view angle).

As a solution to such a problem, there has been proposed a transmission screen which uses a microlens array (microlens substrate) in place of the lenticular lens. (see, for example, Japanese Laid-Open Patent Application No. 2000-131506). The transmission screen has an advantage that the view angle can be increased both in lateral and vertical directions.

Such a microlens array (microlens substrate) is normally manufactured by employing photolithography technology (see, for example, Japanese Laid-Open Patent Application No. 2001-341210). However, it is extremely difficult to manufacture a microlens array with a relatively large screen area such as those used for the rear projector by the conventional photolithography technology. For this reason, the rear projector is sometimes manufactured by combining a plurality of microlens arrays each having a relatively small screen area. However, in such a case, there is a problem that the joining lines of the microlens arrays show up in the projected image.

SUMMARY OF THE INVENTION

It is one object of the present invention to provide a manufacturing method capable of manufacturing a substrate with concave portions at high productivity.

It is another object of the present invention to provide a substrate with concave portions and a substrate with concave portions for microlenses manufactured by the method.

Further, it is yet another object of the present invention to provide a microlens substrate manufactured using the substrate with concave portions for microlenses.

Furthermore, it is still yet another object of the present invention to provide a transmission screen and a rear projector equipped with the microlens substrate.

In order to achieve the above object, in one aspect of the present invention, the present invention is directed to a method of manufacturing a substrate with a plurality of concave portions. The method comprising the steps of:
forming a mask on the substrate;
forming a plurality of initial holes on the mask by means of a physical method; and
forming the plurality of concave portions in the substrate by subjecting the mask with the plurality of initial holes to an etching process.

This makes it possible to manufacture a substrate with concave portions at a high productivity. In particular, the concave portions can be formed in a large-sized substrate easily.

It is preferable that the physical method includes blast processing.

Further, it is preferable that the blast processing is carried out using glass beads as blast media.

This makes it possible to form the initial holes on the mask suitably.

In the method of manufacturing a substrate with concave portions according to the present invention, it is preferable that the blast processing is carried out using blast media of which average diameter is in the range of 20 to 200 µm.

This makes it possible to form desired initial holes.

Further, it is preferable that the blast processing is carried out by spraying blast media with the blast pressure in the range of 1 to 10 kg/cm$^2$.

This makes it possible to form desired initial holes effectively.

It is preferable that the blast processing is carried out by spraying blast media so as to have a blast density in the range of 10 to 100 kg/m$^2$.

This makes it possible to form desired initial holes effectively.

It is preferable that the mask is formed of Cr or chromium oxide as a main component thereof.

Further, it is preferable that the average thickness of the mask is in the range of 0.05 to 2.0 µm.

This makes it possible to form the initial holes in the initial hole formation process and to protect the substrate more surely in the etching process.

It is preferable that the etching process includes a wet etching process.

This makes it possible to form the concave portions with suitable curved portion for formation of the microlenses easily and surely.

It is preferable that the wet etching process is carried out using ammonium hydrogen difluoride or ammonium fluoride as an etchant.

This makes it possible to carry out the steps safely because a 4 wt % or less solution of ammonium hydrogen difluoride solution or an ammonium fluoride solution is not poison.

It is preferable that the method further comprises the step of removing the mask after the etching process.

By removing the mask, the substrate on which concave portions are formed can be obtained.

It is preferable that the substrate is constituted from alkali-free glass.

This makes it possible to facilitate machining and to obtain a substrate with concave portions having required optical properties.

It is preferable that the plurality of concave portions are provided for microlenses.

This makes it possible to use this invention for manufacture of a microlens substrate.

In another aspect of the present invention, the present invention is directed to a method of manufacturing a substrate with a plurality of concave portions. The method comprises the steps of:
forming a mask on the substrate;
forming a plurality of initial holes on the mask by means of irradiation with laser beams; and forming the plurality of concave portions on the substrate by subjecting the mask with the plurality of initial holes to an etching process.

This makes it possible to manufacture a substrate with concave portions at a high productivity. In particular, the concave portions can be formed in a large-sized substrate easily.

It is preferable that the mask is formed of Cr or chromium oxide as a main component thereof.

Further, it is preferable that the average thickness of the mask is in the range of 0.05 to 2.0 µm.

Moreover, it is preferable that the etching process includes a wet etching process.

Furthermore, it is preferable that the wet etching process is carried out using ammonium hydrogen difluoride or ammonium fluoride as an etchant.

It is preferable that the method further comprises the step of removing the mask after the etching process.

Further, it is preferable that the substrate is constituted from alkali-free glass.

Moreover, it is preferable that the concave portions are provided for microlenses.

Further, in yet another aspect of the present invention, the present invention is directed to a substrate with a plurality of concave portions, the substrate being manufactured by a manufacturing method, the method comprising the steps of:
  forming a mask on the substrate;
  forming a plurality of initial holes on the mask by means of a physical method or irradiation with laser beams; and
  forming the plurality of concave portions in the substrate by subjecting the mask with the plurality of initial holes to an etching process.

This makes it possible to manufacture a substrate with concave portions at a high productivity. In particular, a relatively large-sized substrate with concave portions can be formed easily and at a low cost.

Further, in yet another aspect of the present invention, the present invention is directed to a substrate with a plurality of concave portions for microlenses, the substrate being manufactured by a manufacturing method, the method comprising the steps of:
  forming a mask on the substrate;
  forming a plurality of initial holes on the mask by means of a physical method or irradiation with laser beams; and
  forming the plurality of concave portions on the substrate by subjecting the mask with the plurality of initial holes to an etching process, the plurality of concave portions being provided for microlenses.

This makes it possible to manufacture a substrate with concave portions for microlenses at a high productivity. In particular, a relatively large-sized substrate with concave portions for microlenses can be formed easily and at a low cost.

Further, in yet another aspect of the present invention, the present invention is directed to a microlens substrate with a plurality of microlenses, the microlens substrate being manufactured using a substrate with a plurality of concave portions for microlenses, the substrate being manufactured by a manufacturing method, the method comprising the steps of:
  forming a mask on the substrate;
  forming a plurality of initial holes on the mask by means of a physical method or irradiation with laser beams; and
  forming the plurality of concave portions in the substrate by subjecting the mask with the plurality of initial holes to an etching process.

This makes it possible to manufacture a substrate with concave portions for microlenses at a high productivity. In particular, a relatively large-sized substrate with concave portions for microlenses can be formed easily and at a low cost.

Moreover, in yet another aspect of the present invention, the present invention is directed to a transmission screen comprising a microlens substrate with a plurality of microlenses, the microlens substrate being manufactured using a substrate with a plurality of concave portions for microlenses, the substrate being manufactured by a manufacturing method, the method comprising the steps of:
  forming a mask on the substrate;
  forming a plurality of initial holes on the mask by means of a physical method or irradiation with laser beams; and
  forming the plurality of concave portions in the substrate by subjecting the mask with the plurality of initial holes to an etching process.

This makes it possible to manufacture a transmission screen at a high productivity. In particular, a relatively large-sized transmission screen can be formed easily and at a low cost.

It is preferable that the transmission screen of the invention further comprises a Fresnel lens portion with a Fresnel lens, the Fresnel lens portion having an emission face and the Fresnel lens being formed in the emission face wherein the microlens substrate is arranged on the emission face side of the Fresnel lens portion.

This makes it possible to manufacture a transmission screen at a high productivity. In particular, a relatively large-sized transmission screen can be formed easily and at a low cost.

In this case, it is preferable that the diameter of the microlens is in the range of 10 to 500 µm.

This makes it possible to further enhance the productivity of the transmission screen while maintaining sufficient resolution in the image projected on the screen.

It is preferable that the transmission screen of the invention further comprises a light diffusion portion arranged between the Fresnel lens portion and the microlens substrate.

This makes it possible to manufacture a transmission screen at a high productivity and to prevent the occurrence of interference patterns such as the so-called moire more effectively.

It is preferable that the light diffusion portion is adapted to diffuse light so that the light is diffused on a substantially entire surface of the light diffusion portion.

Since this makes it possible to prevent decrease of a light diffusing function even though the thickness of element constituting the light diffusion portion is reduced, it is possible to reduce the thickness of the element constituting the light diffusion portion. Therefore, it is possible to shorten the distance between the Fresnel lens portion and the microlens substrate, and to prevent occurrence of a ghost, decrease of contrast, and decrease of transmissivity due to internal diffusion. Further, by reducing the thickness of the element constituting the light diffusion portion, it is possible to prevent deterioration of an image sufficiently so as to avoid broadening the distance between the Fresnel lens portion and the microlens substrate.

It is preferable that the haze value of the light diffusion portion is in the range of 5 to 95%.

This makes it possible to lower the regularity (intensity, angle, phase, and the like) of light entered into each microlens, to prevent and suppress occurrence of turbidity or blurring in the image projected on the screen while sufficiently suppressing the occurrence of the diffracted light or moire.

It is preferable that the glossiness of the light diffusion portion is in the range of 5 to 40%.

This makes it possible to sufficiently suppress the occurrence of regular interference pattern which is generated by overlapping the Fresnel lens portion and the microlens substrate regularly arranged at regular intervals. It is possible to sufficiently prevent and suppress the occurrence of feeling of surface roughness and blurring in the image projected on the screen while sufficiently preventing and suppressing the occurrence of diffracted light and moire.

It is preferable that the surface of the light diffusion portion has an irregularities comprised of roughly subulate concave portions.

This makes it possible to sufficiently prevent and suppress the occurrence of diffracted light and moire.

It is preferable that the light diffusion portion includes a resin sheet having one roughened surface.

This makes it possible to sufficiently prevent and suppress the occurrence of diffracted light and moire.

It is preferable that the diameter of the microlens is in the range of 10 to 500 μm.

This makes it possible to further enhance the productivity of the transmission screen while maintaining sufficient resolution in the image projected on the screen.

In yet another aspect of the present invention, the present invention is directed to a rear projector comprising a transmission screen. The transmission screen has a microlens substrate with a plurality of microlenses, and the microlens substrate is manufactured using a substrate with a plurality of concave portions for microlenses. The substrate is manufactured by a manufacturing method;
  wherein the method comprises the steps of:
    forming a mask on the substrate;
    forming a plurality of initial holes on the mask by means of a physical method or irradiation with laser beams; and
    forming the plurality of concave portions in the substrate by subjecting the mask with the plurality of initial holes to an etching process.

This makes it possible to manufacture a rear projector at a high productivity. In particular, a relatively large-sized rear projector can be formed easily and at a low cost.

It is preferable that the rear projector according to the invention further comprises:
  a projection optical unit; and
  a light guiding mirror.

This makes it possible to manufacture a rear projector at a high productivity. In particular, a relatively large-sized rear projector can be formed easily and at a low cost.

BRIEF DESCRIPTION OF THE DRAWINGS

The foregoing and other objects, features and advantages of the invention will become more readily apparent from the following detailed description of preferred embodiments of the invention which proceeds with reference to the accompanying drawings.

PREFERRED EMBODIMENTS OF THE INVENTION

A detailed description of the preferred embodiments according to the present invention will now be made with reference to the accompanying drawings It is to be understood that each of a substrate with concave portions, a substrate with concave portions for microlenses and a microlens substrate according to the invention includes both a separate substrate and a wafer.

Moreover, in the following description, the case of applying the substrate with concave portions of the invention to the substrate with concave portions for microlenses will be described as a representative example.

Figure 7:
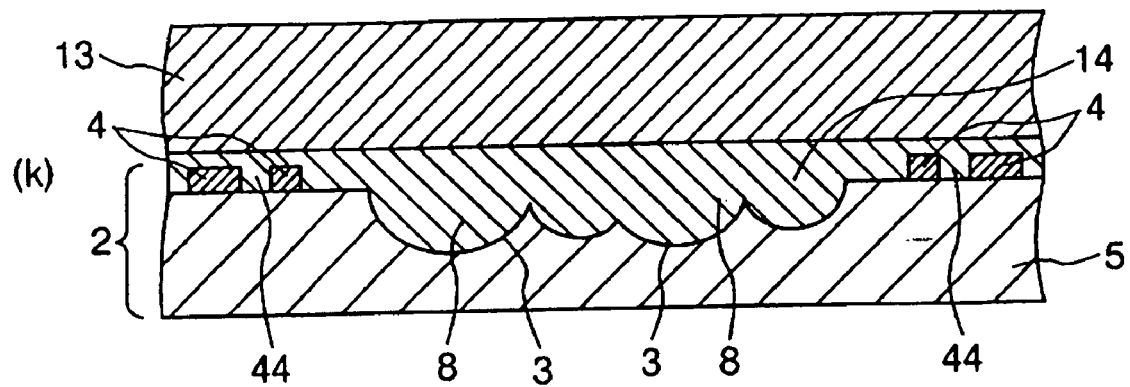
FIG. 7 is a schematic sectional view showing a method of manufacturing the microlens substrate according to the invention.
Figure 7:
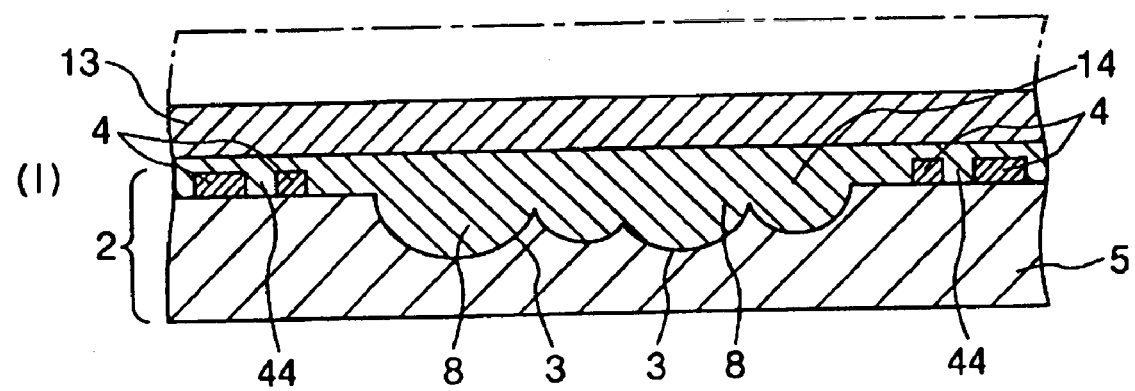
Figure 8:
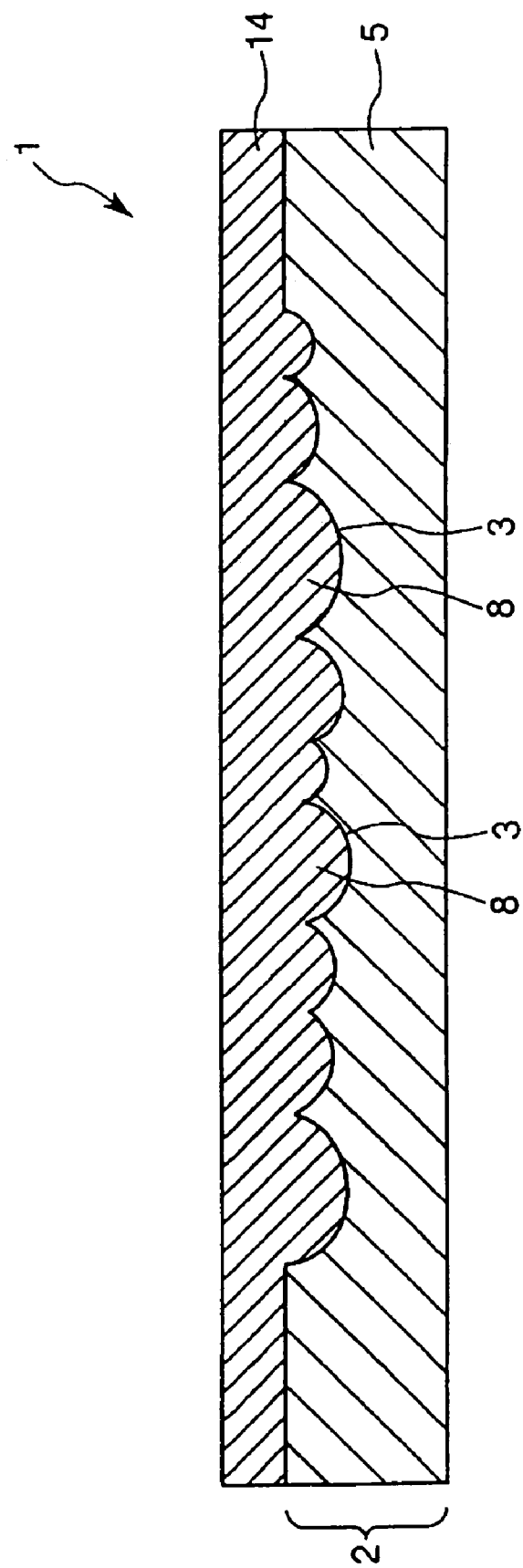
FIG. 8 is a schematic sectional view showing the microlens substrate according to the invention.
Figure 9:
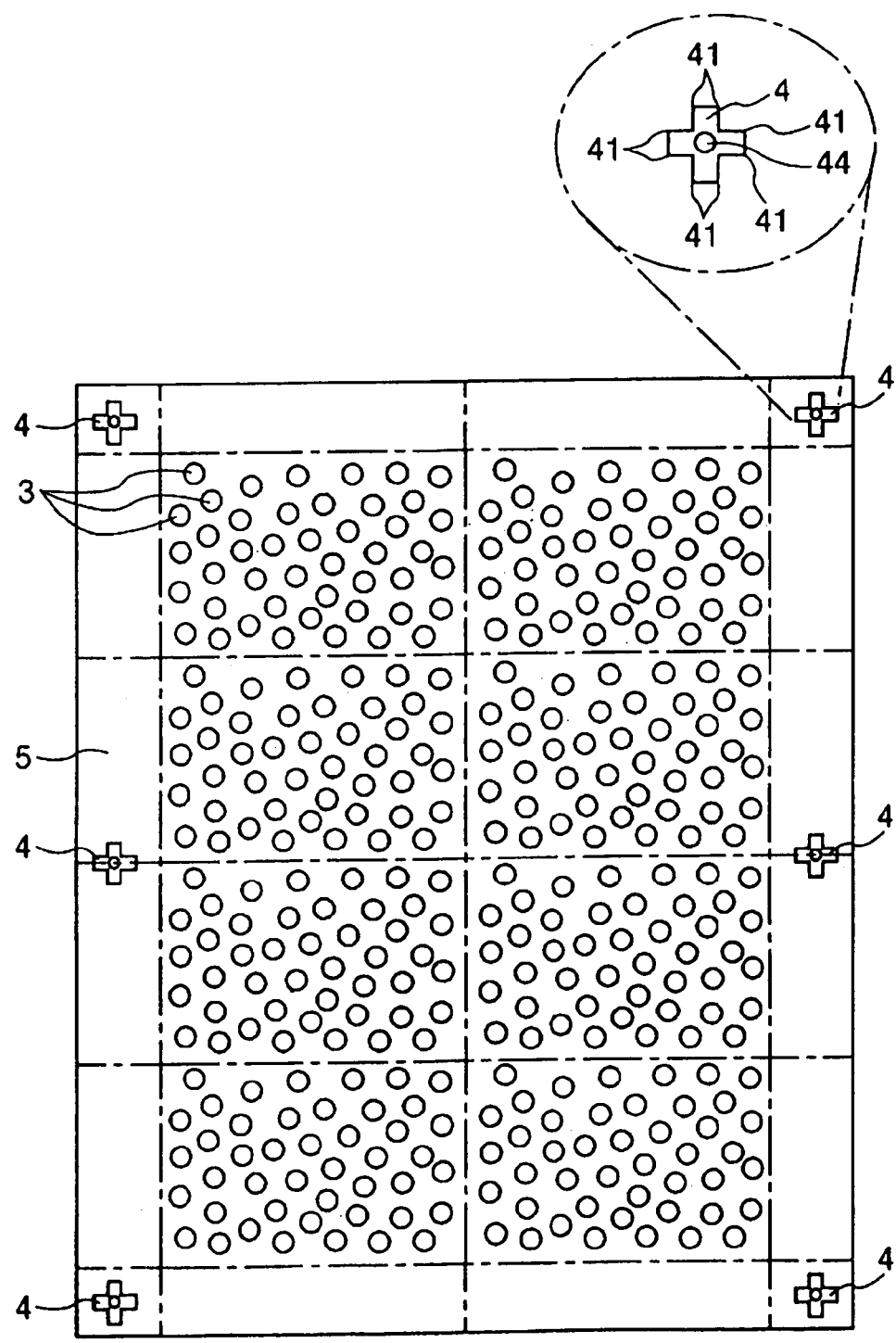
FIG. 9 is a schematic sectional view showing the substrate with concave portions for microlenses according to the invention.

FIGS. 1–6 are schematic sectional views showing a method of manufacturing the substrate with concave portions for microlenses when the substrate with concave portions according to the invention is applied to the substrate with concave portions for microlenses. FIG. 7 is a schematic sectional view showing a method of manufacturing the microlens substrate according to the invention. FIG. 8 is a schematic sectional view showing the microlens substrate according to the invention. FIG. 9 is a schematic sectional view showing the substrate with concave portions for microlenses according to the invention.

As shown in FIG. 8, a microlens substrate 1 has a substrate 2 with concave portions for microlenses and a transparent resin layer 14 having a predetermined index of refraction. The substrate 2 with concave portions for microlenses is formed of a substrate 5 with a plurality of concave portions (concave portions for the microlenses) 3 on the surface thereof. In the resin layer 14, a plurality of microlenses 8 are formed by resin filled in the concave portions 3 of the substrate 2 with concave portions for microlenses.

Prior to proceeding to the description of the method of manufacturing the microlens substrate of the invention, embodiments of the method of manufacturing the substrate with concave portions for microlenses (substrate with concave portions) of the invention will be described first by reference to FIGS. 1–6.

In the present invention, desired concave portions (namely, the concave portions having desired shape and dimensions) for lenses (concave portions for microlenses) are obtained by forming a plurality of initial holes in a mask prepared on the surface of a substrate by means of a physical method or laser irradiation, and then carrying out etching process to the plurality of initial holes. Although a large number of concave portions for microlenses are actually formed on the substrate, the description in the following will be given by showing only a part of them in order to simplify the explanation.

First, the substrate 5 is prepared in manufacturing the substrate 2 with concave portions for microlenses.

It is preferred that a substrate having a uniform thickness without flexure and blemishes is used for the substrate 5. Further, it is also preferred that a substrate with a surface cleaned by washing or the like is used for the substrate 5.

Although alkali-free glass, soda-lime glass, crystalline glass, quartz glass, lead glass, potassium glass, borosilicate glass, or the like may be mentioned as the material for the substrate 5, alkali-free glass and crystalline glass (for example, neoceram or the like) are preferable among them. By the use of alkali-free glass or crystalline glass, it is easy to process the material for the substrate 5, and it is possible to obtain the substrate having concave portions with preferable optical properties. Moreover, since alkali-free glass or crystalline glass is relatively inexpensive, it is also advantageous from the viewpoint of manufacturing cost.

Although the thickness of the substrate 5 varies depending upon various conditions such as the material constituting the substrate 5 and its index of refraction, it is generally preferable to be in the range of 0.3 to 20 mm, and more preferably in the range of 0.7 to 8 mm. By restricting the range of the thickness in such a range, it is possible to obtain a compact substrate 2 with concave portions for microlenses that has required optical properties.

<1> As shown in FIG. 1(a), a mask 6 is formed on the surface of the prepared substrate 5 (mask formation process). Then, a rear face protective film 69 is formed on the rear face of the substrate 5 (i.e., the face side opposite to the face on which the mask 6 is formed). Needless to say, the mask 6 and the rear face protective film 69 may be formed simultaneously.

It is preferable that the mask 6 permits initial holes 61 to be formed therein by means of a physical method or irradiation with laser beams in step <2> (described later), and has resistance to etching in step <3> (described later). In other words, it is preferable that the mask 6 is constituted such that it has an etching rate nearly equal to or smaller than that of the substrate 5.

From such a viewpoint, for example, metals such as Cr, Au, Ni, Ti, Pt, and the like, alloys containing two or more kinds selected from these metals, oxides of these metals (metal oxides), silicon, resins, or the like may be mentioned as the material for the mask 6. Alternatively, the mask 6 may be given a laminated structure by a plurality of layers formed of different materials such as a Cr/Au laminate.

The method of forming the mask 6 is not particularly limited. In the case where the mask 6 is constituted from metal materials such as Cr and Au or metal oxides such as chromium oxide, the mask 6 can be suitably formed by evaporation method, sputtering method, or the like, for example. On the other hand, in the case where the mask 6 is formed of silicon, the mask 6 can be suitably formed by sputtering method, CVD method, or the like, for example.

In the case where the mask 6 is formed of chromium oxide or chromium as a main component thereof, the initial holes 61 can be easily formed by an etching process (described later), and the substrate 5 can be protected in the etching process more surely. Further, when the mask 6 has been formed of chromium oxide or chromium as a main component thereof, in the initial-hole forming process (described later), a solution of ammonium hydrogen difluoride ($NH_4HF_2$) or a solution of ammonium fluoride ($NH_4F$), for example, may be used as an etchant. Since a 4 wt % or less solution (containing 4 wt % (i.e., 4% by weight) or less of ammonium hydrogen difluoride) of ammonium hydrogen difluoride or a solution containing ammonium fluoride is not poison, it is possible to prevent its influence on the human body during work and on the environment more surely. Further, hydrogen peroxide solution or the like may be contained in the etchant. Furthermore, in the case where the mask 6 is formed of chromium oxide, for example, the mask 6 may be formed first by forming a chromium film mainly consisting of chromium on the substrate 5, and then oxidizing at least the vicinity of the surface of the chromium film.

In the case where the mask 6 is mainly formed of Au, by making the thickness of the mask 6 relatively large, for example, the impact of collision of blast media (shot balls) 611 during the blast processing in step <2> (described later) can be reduced, thereby being capable of making the shapes of the formed initial holes 61 well-balanced.

Although the thickness of the mask 6 also varies depending upon the material constituting the mask 6, it is preferable to be in the range of 0.05 to 2.0 µm, and more preferably in the range of 0.1 to 0.5 µm. If the thickness is below the lower limit given above, it becomes difficult depending upon the constituent material or the like of the mask 6 to sufficiently reduce the impact of the shot during the shot blast process in step <2> (described later), whereby there is a possibility to deform shapes of the formed initial holes 61. In addition, there is a possibility that sufficient protection for the masked portion of the substrate 5 cannot be obtained during a wet etching process in step <3> (described later). On the other hand, if the thickness is over the upper limit, in addition to the difficulty in formation of the initial holes 61 by means of the physical method or irradiation with laser beams, there will be a case in which the mask 6 tends to be easily removed due to internal stress of the mask 6 depending upon the constituent material or the like of the mask 6.

The rear face protective film 69 is provided for protecting the rear face of the substrate 5 in the subsequent processes. Erosion, deterioration or the like of the rear face of the substrate 5 is suitably prevented by means of the rear face protective film 69. Since the rear face protective film 69 is formed using the same material as the mask 6, it may be provided in a manner similar to the formation of the mask 6 simultaneous with the formation of the mask 6.

Figure 1:
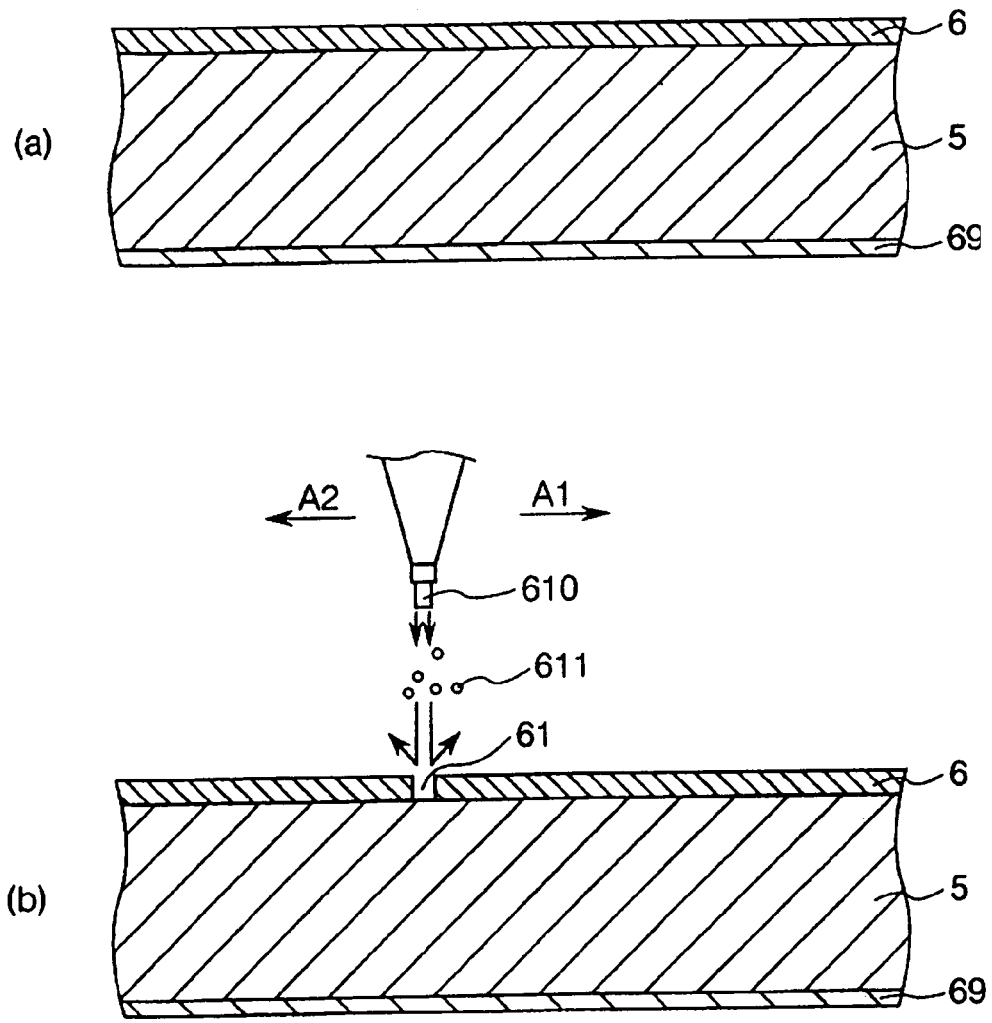
FIG. 1 is a schematic sectional view showing a method of manufacturing the substrate with concave portions for microlenses when the substrate with concave portions according to the invention is applied to the substrate with concave portions for microlenses.

<2> Next, as shown in FIGS. 1(*b*) and 2(*c*), the plurality of initial holes 61 that will be utilized as mask openings in the etching (described later) are formed in the mask 6 by means of the physical method or irradiation with laser beams (initial hole formation process).

The physical methods of forming the initial holes 61 includes such methods as, for example, blast processing such as shot blast, sandblast or the like, pressing, dot printing, tapping, rubbing, or the like. In the case where the initial holes 61 are formed by means of the blast processing, it is possible to form the initial holes 61 with high efficiency in a shorter time even for a substrate 5 with a relatively large area (i.e., area of the region for formation of microlenses 8).

Further, in the case where the initial holes 61 are formed by means of irradiation with laser beams, the kind of laser beams to be used is not particularly limited, but Ar laser, carbon dioxide laser, femtosecond laser, YAG laser, excimer laser, or the like may be mentioned. In the case where the initial holes 61 are formed by means of the irradiation of laser beams, it is possible to easily and precisely control the size of the initial holes 61, distance between adjacent initial holes 61, or the like. Moreover, in the case where the initial holes 61 are formed by means of the irradiation of laser beams, the laser beams may be irradiated from the front side of the substrate 5 (i.e., the face side on which the mask 6 is formed), or may be irradiated from the rear side of the substrate 5 (the face side opposite to the face on which the mask 6 is formed). By irradiating the laser beams from the rear face of the substrate 5, it is possible to form the initial holes 61 in desired portions more easily and surely even if, for example, stains or the like are adhered to the portions of the mask 6 where the initial holes 61 are to be formed.

Here, the case of forming the initial holes 61 on the mask 6 by employing shot blast as the physical method will be described as an example.

In the shot blast, as shown in FIG. 1(*b*), the initial holes 61 are formed in the mask 6 by spraying blast media 611 onto the surface of the mask 6 from a nozzle 610 arranged perpendicularly to the surface above the surface where the mask 6 is formed on the substrate 5. The initial holes 61 are formed on the entire surface of the mask 6 by applying shot blast over the entire surface of the mask 6 with the movement of the nozzle 610 in the direction as shown by arrows A1 and A2 in FIG. 1(*b*).

As the blast media 611, steel grit, brown fused alumina, white fused alumina, glass bead, stainless steel bead, garnet, silica sand, plastic, cut wire, slag, or the like may be mentioned, and glass bead is especially preferable among them. By using such a blast media, it is possible to form the initial holes 61 on the mask 6 suitably.

It is preferable that the average diameter of the blast media 611 is in the range of 20 to 200 μm, and more preferably in the range of 50 to 120 μm. If the average diameter of the blast media 611 is less than the lower limit in the above, the formation of the initial holes 61 with high efficiency may become difficult, or the particles of the blast media 611 tend to form an aggregate by sticking each other. On the other hand, if the average diameter of the blast media 611 is over the upper limit in the above, the formed initial holes 61 become large, the initial holes 61 become large-sized by mutual sticking, or initial holes 61 having different shapes tend to be formed.

It is preferable that the blast pressure of the blast media 611 (i.e., this means air pressure in the spraying process) is in the range of 1 to 10 kg/cm$^2$, and more preferably in the range of 3 to 5 kg/cm$^2$. If the blast pressure of the blast media 611 is less than the lower limit in the above, the impact of shot is weakened, whereby there is a case in which sure formation of the initial holes 61 in the mask 6 becomes difficult. On the other hand, if the blast pressure of the blast media 611 is over the upper limit in the above, the impact of shot becomes too strong, and therefore, there is a possibility that the particles of blast media 611 are crushed, or the shape of the initial holes 61 is deformed by the impact.

Moreover, it is preferable that the spraying density (blast density; this means weight of blast media 611 sprayed on per unit are of the mask 6) of the blast media 611 is in the range of 10 to 100 kg/m$^2$, and more preferably in the range of 30 to 50 kg m$^2$. If the spraying density of the blast media 611 is less than the lower limit in the above, the number of shots is decreased, and therefore, it takes a long time to form the initial holes 61 uniformly on the entire surface of the mask 6. On the other hand, if the spraying density of the blast media 611 is over the upper limit in the above, the initial holes 61 are formed in an overlapping manner so that large holes are formed by joining with each other, or so that initial holes with different shapes tend to be formed.

Figure 2:
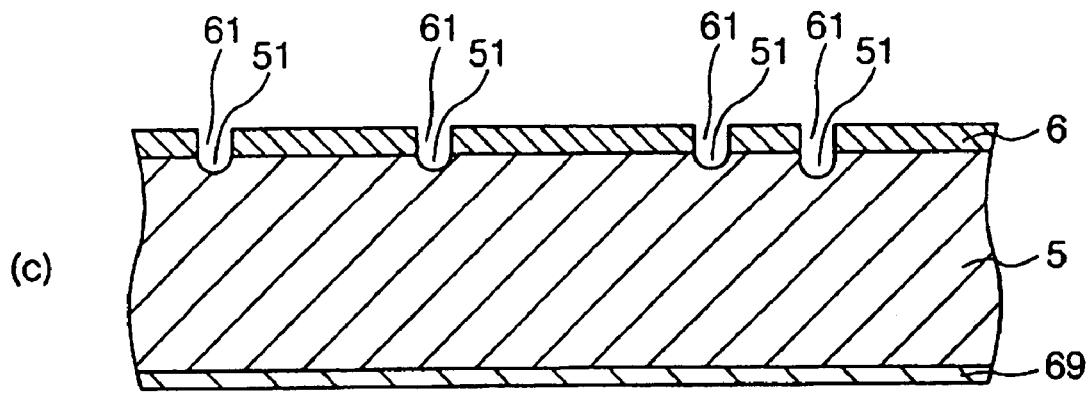
FIG. 2 is a schematic sectional view showing a method of manufacturing the substrate with concave portions for microlenses when the substrate with concave portions according to the invention is applied to the substrate with concave portions for microlenses.
Figure 2:
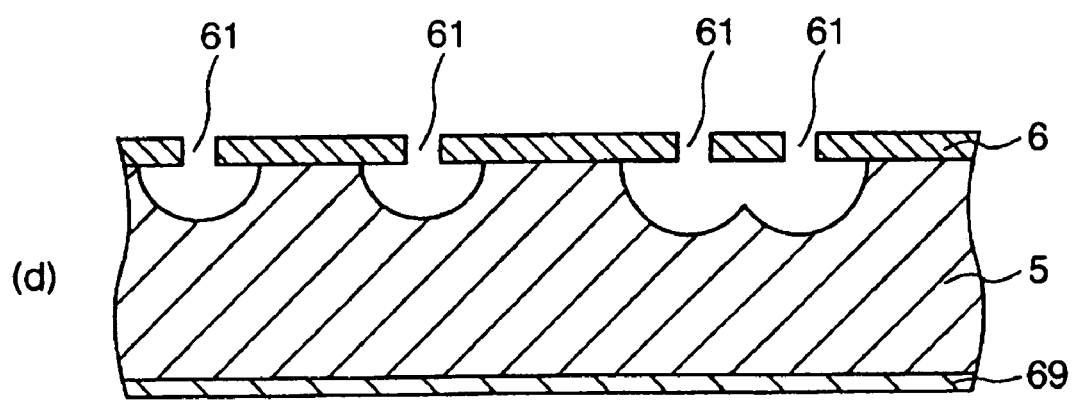
Figure 3:
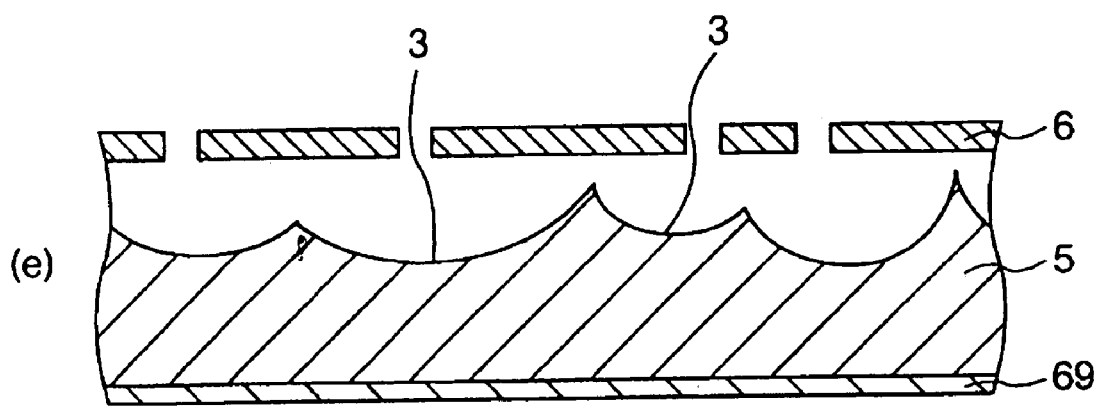
FIG. 3 is a schematic sectional view showing a method of manufacturing the substrate with concave portions for microlenses when the substrate with concave portions according to the invention is applied to the substrate with concave portions for microlenses.
Figure 4:
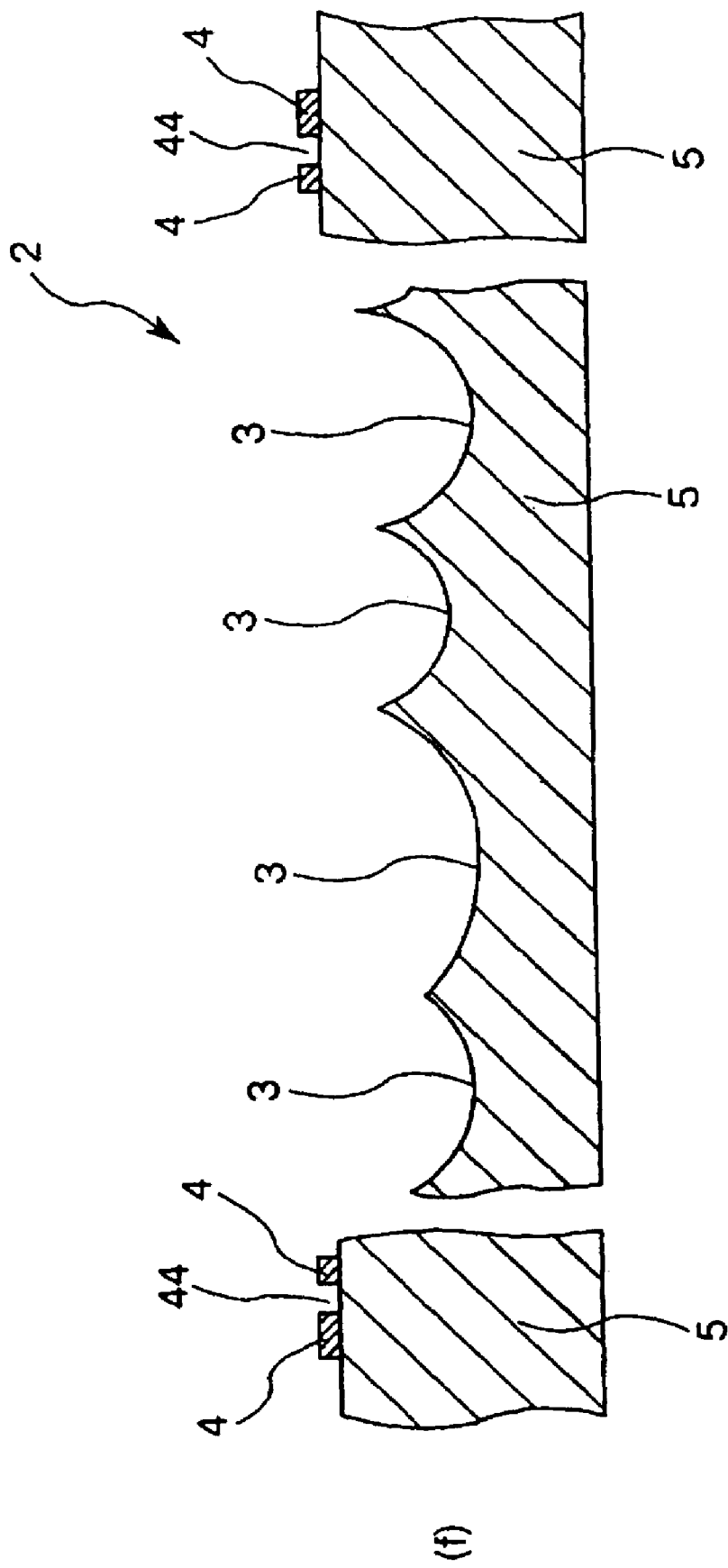
FIG. 4 is a schematic sectional view showing a method of manufacturing the substrate with concave portions for microlenses when the substrate with concave portions according to the invention is applied to the substrate with concave portions for microlenses.
Figure 5:
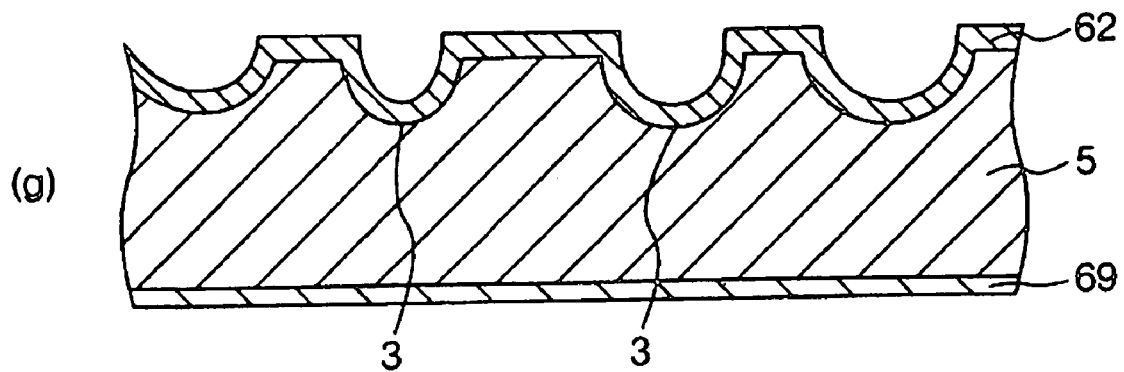
FIG. 5 is a schematic sectional view showing a method of manufacturing the substrate with concave portions for microlenses when the substrate with concave portions according to the invention is applied to the substrate with concave portions for microlenses.
Figure 5:
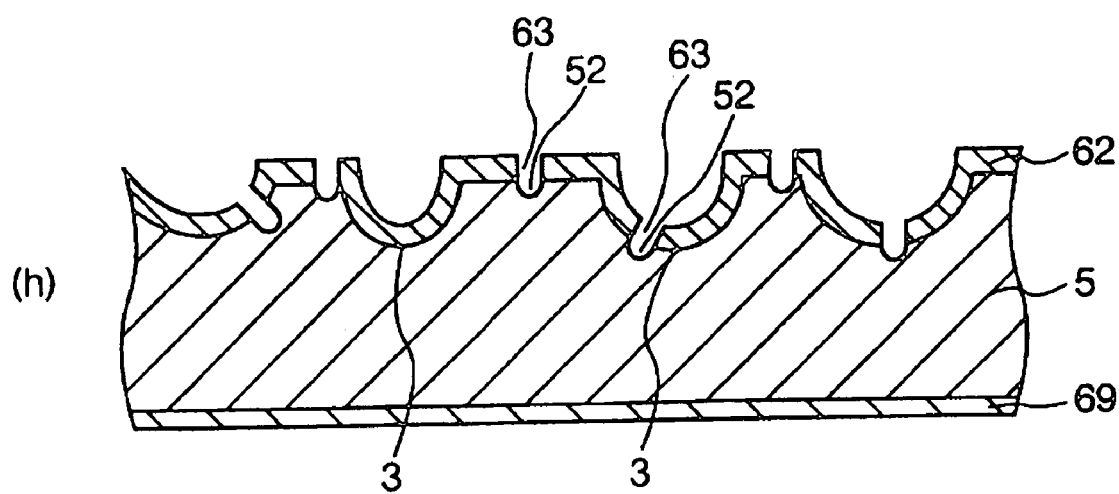
Figure 6:
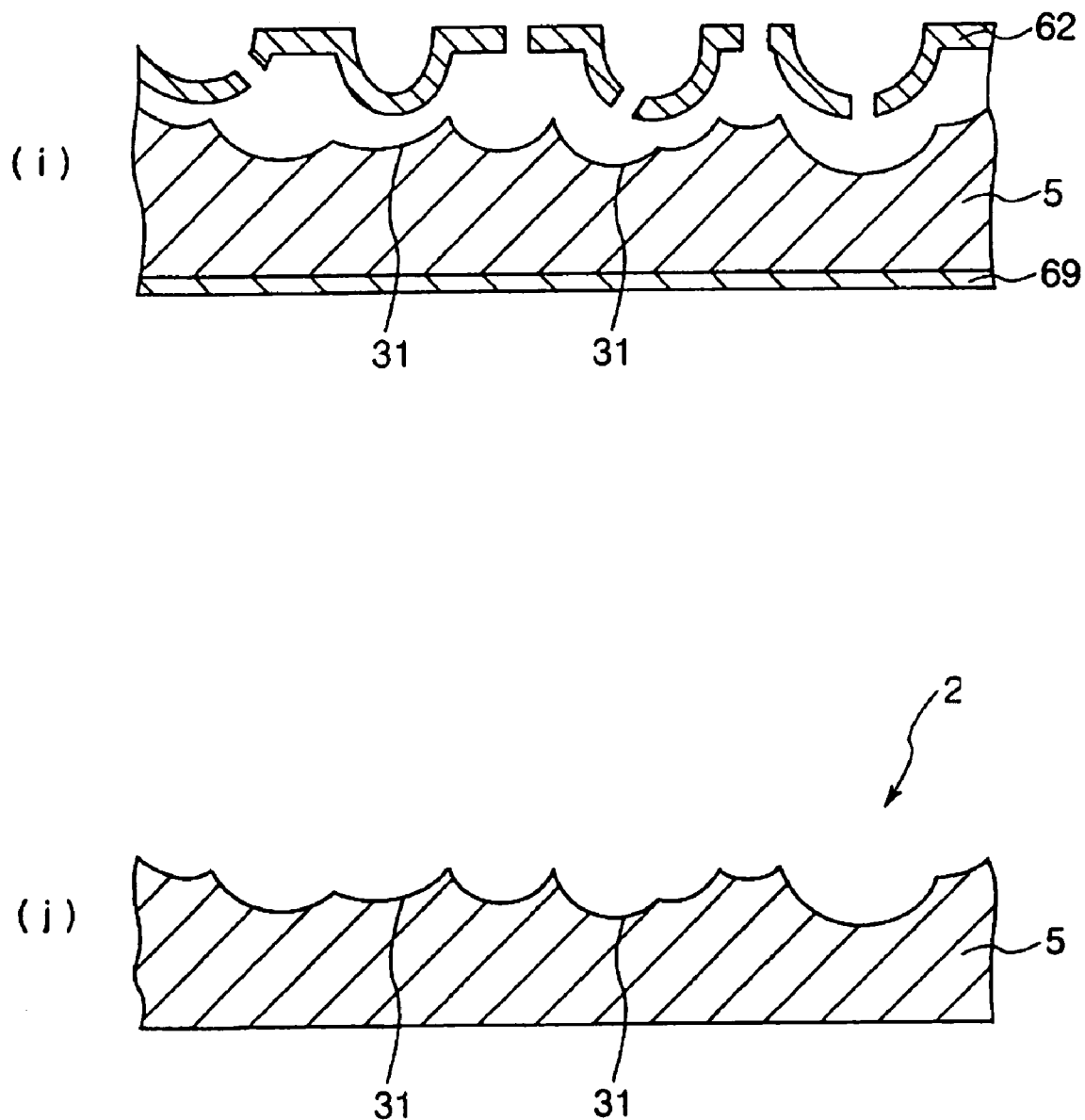
FIG. 6 is a schematic sectional view showing a method of manufacturing the substrate with concave portions for microlenses when the substrate with concave portions according to the invention is applied to the substrate with concave portions for microlenses.

The initial holes 61 are formed in the mask 6 as shown in FIG. 2(*c*) by carrying out the shot blast mentioned above.

It is preferable that the initial holes are formed uniformly on the entire surface of the mask 6. Further, it is preferable that the initial holes 61 are formed in such a manner that small holes are arranged with a predetermined interval so that there is no flat portion on the surface of the substrate 5, and that the surface is covered with concave portions with almost no space when a wet etching process is carried out in step <3> (described later). For that purpose, for example, the duration of the shot blast may be increased, or the shot blast process may be repeated for several times.

More specifically, for example, it is preferable that the shape in plan view of the formed initial holes 61 is nearly circular and each of the initial holes 61 has an average diameter of the range of 1 to 20 μm. Further, it is preferable that the initial holes 61 are formed on the mask 6 at the rate of one thousand to one million holes per square centimeter (cm$^2$), and more preferably ten thousand to 500 thousand holes per square centimeter (cm$^2$). Furthermore, needless to say, the shape of the initial hole 61 is not limited to a nearly circular shape.

When the initial holes 61 are formed in the mask 6, as shown in FIG. 2(*c*), initial concave portions 51 may also be formed by removing parts of the surface of the substrate 5 in addition to the initial holes 61. This makes it possible to increase contact area with the etchant when the etching process in step <3> (described later) is carried out, whereby erosion can be started suitably. Further, by adjusting the depth of the initial concave portions 51 it is also possible to adjust the depth of the concave portions 3 (i.e., maximum thickness of the lens). Although the depth of the initial concave portion 51 is not particularly limited, it is preferable that it is 5.0 μm or less, and more preferably in the range of 0.05 to 0.5 μm.

As mentioned above, the case of forming the initial holes 61 in the mask 6 by the shot blast is described as an example, but the method is not limited to the shot blast, and the initial holes 61 may be formed in the mask 6 by a variety of physical methods or irradiation with laser beams.

Further, although the arrangement of the formed initial holes 61 is not particularly limited, and it may is a regular or random pattern. However, it is preferable that it is a random pattern in the case where the obtained substrate with concave portions (substrate with concave portions for microlenses) is utilized for the manufacture of a screen or a rear projector (described later). This makes it possible to prevent the occurrence of interference patterns such as the so-called moire more effectively.

The method of forming the initial holes 61 by the shot blast is described above. However, as mentioned above, the initial holes 61 may be formed by a method other than the shot blast (for example, a blast processing other than the shot blast, laser machining, pressing, dot printing, tapping, rubbing, or the like).

When the initial holes 61 are formed by pressing (press working), the initial holes 61 can be formed, for example, by pressing a roller having protrusions with a predetermined pattern on the mask 6 and rolling the roller over the mask 6.

Moreover, the initial holes 61 may be formed in the formed mask 6 not only by means of the physical method or irradiation with laser beams, but also by, for example, previously arranging foreign objects on the substrate 5 with a predetermined pattern when the mask 6 is formed on the substrate 5, and then forming the mask 6 on the substrate 5 with the foreign objects to form defects in the mask 6 by design so that the defects are utilized as the initial holes 61.

In this way, in the present invention, by the formation of the initial holes 61 in the mask by means of the physical method or irradiation with laser beams, it is possible to form openings (initial holes) with a predetermined pattern in the mask easily and inexpensively compared with the formation of the openings in the mask by the conventional photolithography method. Further, the physical method or irradiation with laser beams makes it possible to deal with a large substrate easily.

<3> Next, as shown in FIGS. 2(d) and 3(e), a large number of concave portions 3 are formed on the substrate 5 by applying the etching process to the substrate 5 using the mask 6 (etching process).

The etching method is not particularly limited, and wet etching process or dry etching process or the like may be mentioned. In the following explanation, the case of using the wet etching process will be described as an example.

By applying the wet etching process to the substrate 5 covered with the mask 6 on which the initial holes 61 are formed, as shown in FIG. 2(d), the substrate 5 is eroded from the portions where no mask is present, namely, from the initial holes 61, whereby a large number of concave portions 3 are formed on the substrate 5.

Further, in the present embodiment, the initial concave portions 51 are formed on the surface of the substrate 5 when the initial holes 61 are formed in the mask 6 in step <2>. This makes the contact area with the etchant increase during the etching process to the substrate, whereby the erosion can be made to start suitably.

Moreover, the formation of the concave portions 3 can be carried out suitably by employing the wet etching process. In the case where an etchant which contains hydrofluoric acid (hydrofluoric acid-based etchant) is utilized, for example, the substrate 5 is eroded more selectively, and this makes it possible to form the concave portions 3 suitably.

In the case where the mask 6 is mainly constituted from chromium or chromium oxide (i.e., the mask 6 is formed of a material containing Cr or chromium oxide as a main component thereof), solution of ammonium hydrogen difluoride or solution of ammonium fluoride is particularly suited as a hydrofluoric acid-based etchant. Since a 4 wt % or less solution of ammonium hydrogen difluoride solution or an ammonium fluoride solution is not poison, it is possible to prevent its influence on the human body during work and on the environment more surely.

Further, the wet etching process permits the processing with simpler equipment than in the dry etching process, and allows the processing for a larger number of substrates at a time. As a result, productivity of the substrates can be enhanced, and substrate 2 with concave portions for microlenses can be provided at a lower cost.

<4> Next, the mask 6 is removed as shown in FIG. 4(f) (mask removal process). At this time, the rear face protective film 69 is removed along with the removal of the mask 6.

In the case where the mask 6 is mainly constituted from chromium or chromium oxide, the removal of the mask 6 can be carried out by means of an etching process using a mixture of ceric nitrate, ammonium and perchloric acid, for example.

As a result of the processing in the above, as shown in FIGS. 4(f) and 9, a substrate 2 with concave portions for microlenses having a large number of concave portions 3 on the substrate 5 is obtained. In this case, as shown in FIG. 9, although the concave portions 3 formed on the substrate 5 are distributed randomly, the arrangement of them is not limited to this structure, and the concave portions 3 may be formed in a regular pattern.

As described above, desired concave portions 3 can be formed on the substrate 5 by first forming the initial holes 61 in the mask 6 by means of a physical method or irradiation with laser beams, and then carrying out an etching process using the mask 6 with the initial holes 61, whereby it is possible to manufacture the substrate 2 with concave portions for microlenses equipped with concave portions 3.

By forming the initial holes 61 in the mask 6 by means of a physical method or irradiation with laser beams, it is possible to form openings (initial holes 61) in a predetermined pattern in the mask 6 easily and inexpensively compared with the case of forming the openings in the mask 6 by means of the conventional photolithography method. As a result, the productivity can be enhanced, and it is possible to provide the substrate 2 with concave portions for microlenses at a lower cost.

Further, according to the method described above, it is possible to carry out a processing for a large-sized substrate easily. Also, according to the method, in the case of manufacturing a large-sized substrate, there is no need to bond a plurality of substrates as the conventional method, whereby it is possible to eliminate the appearance of seams of bonding. As a result, it is possible to manufacture a high quality large-sized substrate with concave portions for microlenses by means of a simple method at a low cost.

Moreover, after the mask 6 is removed in step <4>, a new mask 62 may be formed on the substrate 5, and may repeat a series of processes including mask formation process, initial hole formation process, wet etching process, and mask removal process.

A specific example will be described in the following.

<B1> First, as shown in FIG. 5(g), a new mask 62 is formed on the substrate 5 with concave portions 3 formed thereon. The mask 62 may be formed in the same way as the mask 6 described above (mask formation process).

<B2> Next, as shown in FIG. 5(h), initial holes 63 are formed in the mask 62 by means of a physical method or irradiation with laser beams (initial hole formation process). At this time, initial concave portions 52 may be formed on the surface of the substrate 5.

<B3> Then, as shown in FIG. 6(i), concave portions 31 are formed by applying an etching process similar to the above-mentioned process using the mask 62 (etching process).

<B4> Finally, as shown in FIG. 6(j), the mask 62 and the rear face protective film 69 are removed (mask removal process).

Steps <B1> to <B4> may be carried out by the methods similar to steps <1> to <4>.

In this way, by repeating a series of processes, it is possible to form concave portions without bias over the entire surface of the substrate 5, and to uniform the shape of the concave portions.

Further, the conditions of each process may be changed for the second or subsequent rounds from those of the first round. By changing the conditions of each process to adjust the shape (size, depth, curvature, concave shape of the concave portion, or the like) of the formed concave portions, desired form may be obtained.

For example, in the initial hole formation process, the size and the density of the initial holes 63 formed in the mask 62, and the size and the depth of the initial concave portions 52 formed in the substrate 5, or the like, can be adjusted by changing the conditions such as the diameter, the blast pressure, the spraying density, the processing duration, or the like of the blast media 611.

Further, in the etching process, the shape of the formed concave portions 3 can be adjusted by changing the side-etching rate. For example, by decreasing the side-etching rate gradually, it is possible to arrange the shape of a plurality of formed concave portions 3 uniformly.

Moreover, for example, in the first round of etching process, by setting the side-etching rate to a large (or small) value, flat portions of the substrate surface may be eliminated (a pre-etching process), and in the second and the subsequent rounds of etching process, by setting the side-etching rate to a small (or large) value, the concave portions 3 may be formed (a regular etching process).

Furthermore, by changing the size of the initial holes 63, the size and the depth of the initial concave portions 52, or the like, and further changing the side-etching rate, it is possible to make the formed concave portions 3a desired aspherical form.

Here, in the case where the series of processes described above are carried out repeatedly, the rear face protective film 69 may be used repeatedly without being removed in step <4> or the like.

In this regard, although a description is omitted, alignment marks 4 may be provided on the substrate 5 as shown in FIGS. 4(f) and 9. The alignment marks 4 are used as the indices for positioning when manufacturing the microlens substrate 1, and various objects using the microlens substrate 1.

Although the positions of formation of the alignment marks 4 are not particularly limited, they may be formed, for example, outside the formation region of the concave portions 3 as shown in FIG. 9.

It is preferable that the alignment marks 4 are formed at a plurality of locations on the substrate 2 with concave portions for microlenses. In particular, it is preferable that the alignment marks 4 are provided at a plurality of positions of the corners of the substrate 2 with concave portions for microlenses. This makes it possible to carry out positioning of the substrate 2 more easily.

FIG. 9 shows an example in which the alignment mark 4 is made in a cross shape. Although the shape of the alignment mark 4 is not particularly limited, it is preferable that the alignment mark 4 has square portions 41 forming corners of the alignment mark 4 as shown in FIG. 9. By providing square portions 41 in the alignment mark 4, it is possible to carry out positioning more precisely.

Moreover, as shown in FIG. 9, it is preferable that the alignment mark 4 has a mark (a circular opening in FIG. 9) indicating the central portion of the alignment mark 4. This makes it possible to further enhance the positioning precision.

Furthermore, the structure and the formation method of the alignment mark 4 is not particularly limited, and it may be formed by forming a layer on the substrate 5, or may be provided as a depression with a shape different from the concave portion 3, as shown in FIGS. 4(f) and 9.

In the above-mentioned embodiment, the alignment marks 4 are formed outside the region for the formation of the concave portions 3 of the substrate 2 with concave portions for microlenses, but needless to say, they may be formed within the formation region of the concave portions 3.

The alignment marks 4 can be used for various cases of positioning when a variety of objects are assembled using the substrate 2 with concave portions for microlenses.

Hereinafter, a method of manufacturing a microlens substrate using the substrate 2 with concave portions for microlenses will be described with reference to FIG. 7.

In this regard, needless to say, the substrate 2 with concave portions for microlenses and the microlens substrate of the invention can be used for the transmission screen and the rear projector (described later), and in addition, they can be used for various kinds of electrooptical devices such as a liquid crystal display (liquid crystal panel), an organic or inorganic electroluminescent (EL) display, a CCD, an optical communication device or the like, and other devices.

<5> First, as shown in FIG. 7(k), a cover glass 13 is bonded to the surface on which the concave portions 3 of the substrate 2 with concave portions for microlenses are formed via an adhesive.

When the adhesive cures (becomes hardened (solidified)), a resin layer (adhesive layer) 14 is formed. Thus, microlenses 8 that are constituted from the resin filled in the concave portions 3 and function as convex lenses are formed in the resin layer 14.

In this regard, it is preferable that an optical adhesive or the like having index of refraction higher than that of the substrate 5 (for example, n=1.60 or so) may be used for the adhesive.

<6> Next, as shown in FIG. 7(l), the thickness of the cover glass 13 is reduced.

This may be accomplished by subjecting the cover glass 13 to grinding, polishing, etching or the like, for example.

Although the thickness of the cover glass 13 is not particularly limited, it is preferable to set it in the range of 10 to 1000 μm, and more preferably in the range of 20 to 150 μm, from the viewpoint of obtaining a microlens substrate 1 having required optical properties.

In the case where the laminated cover glass 13 has an optimum thickness for carrying out the subsequent processes, this process, is not needed of course.

In this way, as shown in FIG. 8, a microlens substrate 1 having a large number of microlenses 8 is obtained.

In the above description of the method of manufacturing the microlens substrate, the case where the concave portions 3 of the substrate 2 with concave portions for microlenses were filled with resin and the resin was interposed between the cover glass 13 and the substrate 2 when the microlenses 8 was formed using the resin was described as an example. However, the microlens substrate may also be manufactured by the 2P method (photopolymerization) in which the substrate 2 with concave portions for microlenses is utilized as the mold.

A method of manufacturing the microlens substrate by means of the 2P method will be described in the following with reference to FIGS. 10 to 12.

Figure 10:
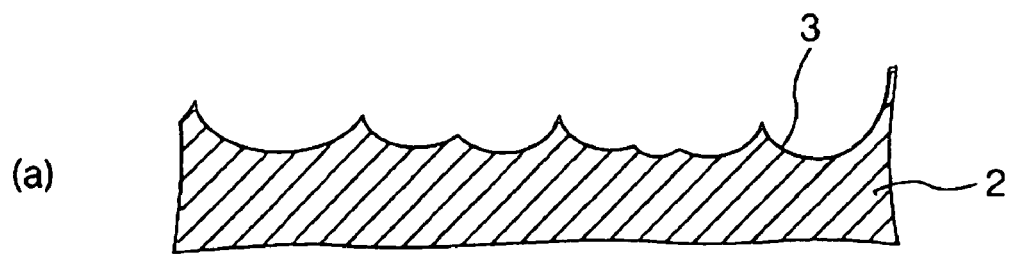
FIG. 10 is a schematic sectional view showing a method of manufacturing the microlens substrate according to the invention.
Figure 10:
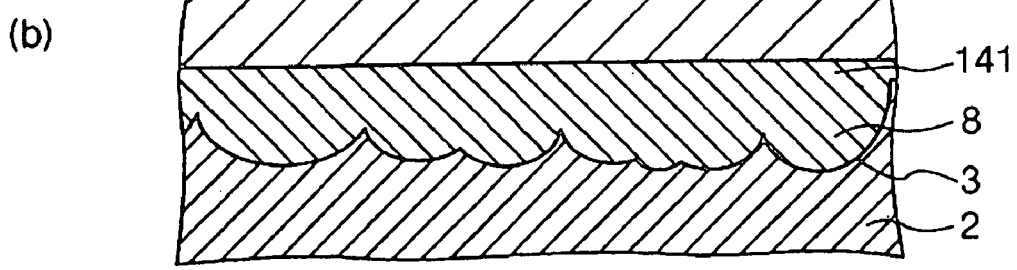
Figure 10:
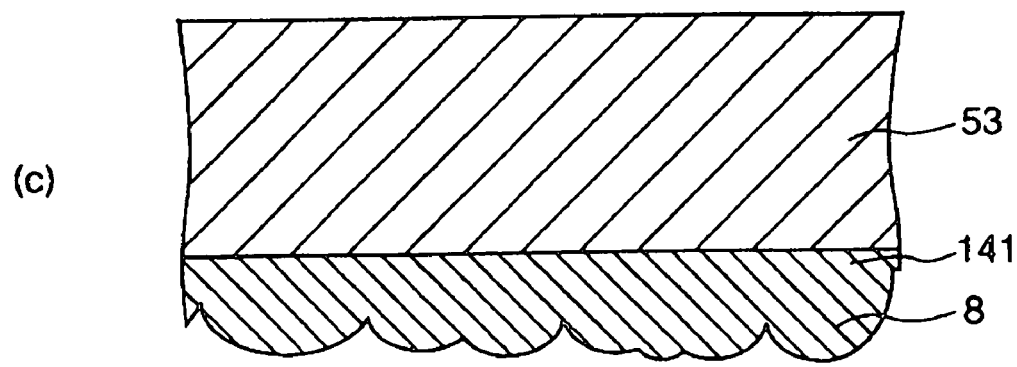

First, as shown in FIG. 10(*a*), the substrate 2 with concave portions for microlenses having a plurality of concave portions 3 for microlenses, which is manufactured using the present invention, is prepared. In the method, the substrate 2 with concave portions for microlenses having the plurality of concave portions 3 is utilized as a mold. By filling resin in the concave portions 3, the microlenses 8 are formed. In this case, the inner surface of the concave portions 3 may be coated with a mold-releasing agent or the like, for example. Then, the substrate 2 with concave portions for microlenses is set, for example, so as to have the concave portions 3 open vertically upward.

<C1> Next, uncured resin that will constitute a resin layer 141 (microlenses 8) is supplied on the substrate 2 with concave portions for microlenses having the concave portions 3.

<C2> Next, a transparent substrate 53 is joined to the uncured resin, and the transparent substrate 53 is made to be closely contacted with the resin by pressing.

<C3> Next, the resin is cured. The method of curing the resin is appropriately selected according to the kind of the resin, and for example, ultraviolet irradiation, heating, electron beam irradiation, or the like may be mentioned.

In this way, as shown in FIG. 10(*b*), the resin layer 141 is formed, and the microlenses 8 are formed by means of the resin filled in the concave portions 3.

<C4> Next, as shown in FIG. 10(*c*), the substrate 2 with concave portions for microlenses functioning as the mold is removed from the microlenses 8. Although the resin layer 141 removed from the substrate 2 with concave portions for microlenses on which the microlenses 8 are formed may be used as a screen without modification, the resin layer 141 may be further subjected to processes such as steps <C5> to <C7> that will be described in the following.

Figure 11:
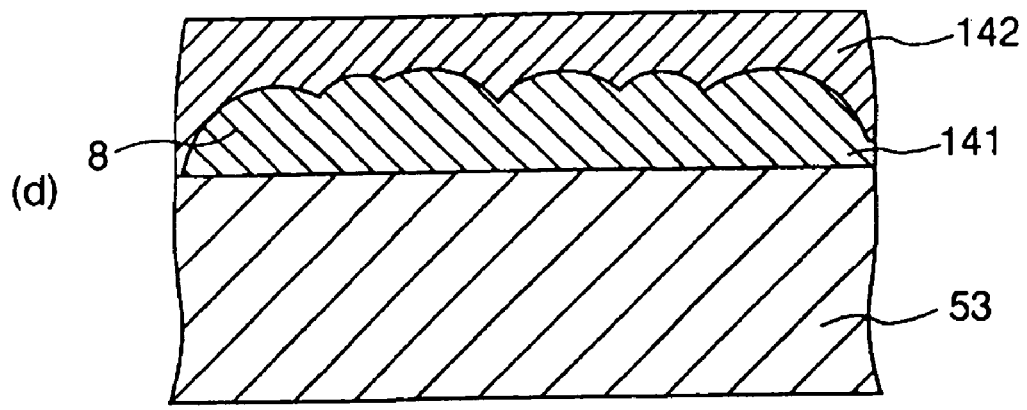
FIG. 11 is a schematic sectional view showing a method of manufacturing the microlens substrate according to the invention.

<C5> Next, as shown in FIG. 11(*d*), for example, after setting the transparent substrate 53 so as to have the microlenses 8 face vertically upward, the uncured resin to constitute a resin layer 142 is supplied on the microlenses 8. As the method of supplying the resin, a coating method such as spin coating, a 2P method using a plate mold, or the like may be mentioned.

Figure 12:
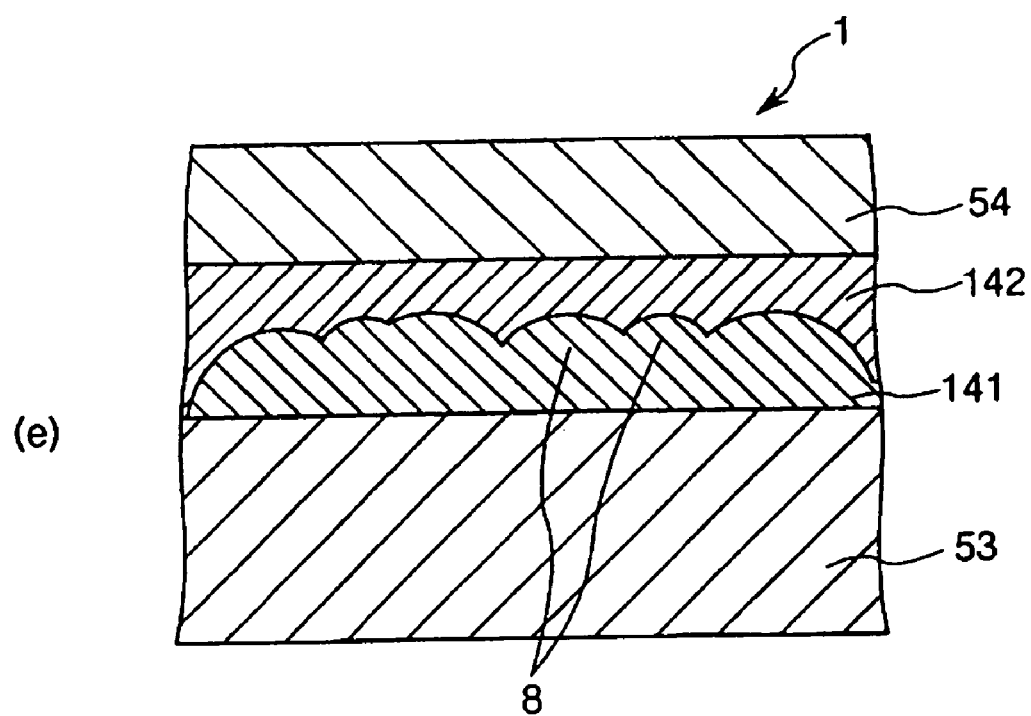
FIG. 12 is a schematic sectional view showing a microlens substrate according to the invention.

<C6> Next, as shown in FIG. 12(*e*), after a substrate (glass layer) 54 is bonded to the resin and is closely contacted by pressing, the resin layer 142 is formed by curing the resin. As the constituent material for the substrate 54, for example, material similar to those of the substrate 5 may be mentioned.

<C7> Then, the thickness of the substrate 54 may be adjusted by grinding, polishing, or the like if required.

In this way, the microlens substrate 1 as shown in FIG. 12 is obtained.

In the above description, a microlens substrate provided with plano-convex lenses (plano-convex microlenses) that is formed using a single substrate with concave portions for microlenses is used, but the microlens substrate according to the present invention is not limited to this type.

For example, a microlens substrate provided with biconvex lenses may be formed using two pieces of substrate with concave portions for microlenses. In this case, it is preferable that each of the two pieces of the substrate with concave portions for microlenses has concave portions for microlenses with a regular pattern. Thus, it is possible to carry out alignment (positioning) of the two pieces of the substrate with concave portions for microlenses easily.

Hereinafter, a description will be given for a microlens substrate provided with biconvex microlenses that is formed using two pieces of the substrate with concave portions for microlenses in which the concave portions for microlenses are formed in a regular pattern.

Figure 13:
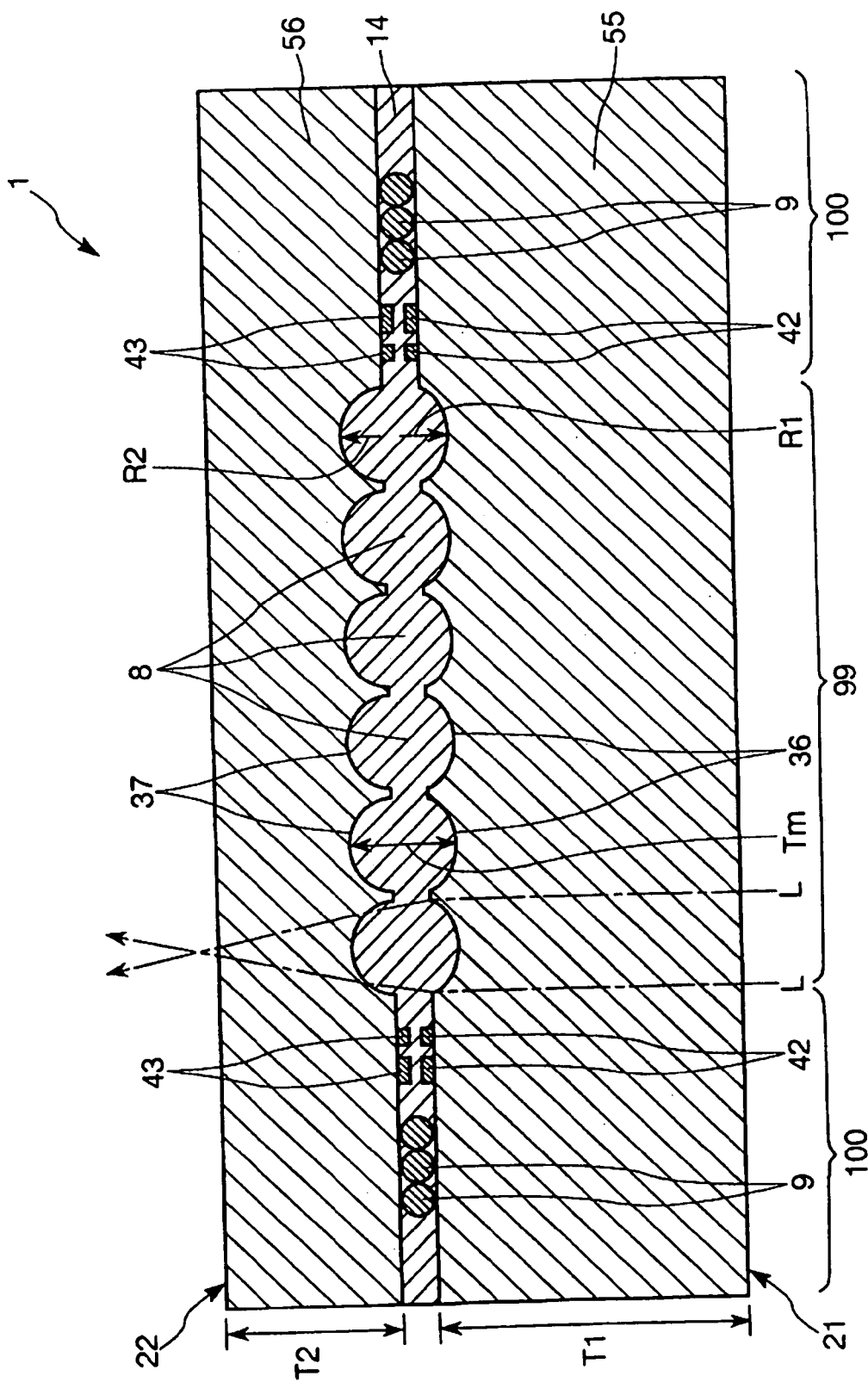
FIG. 13 is a schematic sectional view showing a microlens substrate according to the invention.

FIG. 13 is a schematic sectional view showing one embodiment of this type of microlens substrate.

As shown in the drawing, this microlens substrate 1 comprises a first substrate with concave portions for microlenses (first substrate) 21, a second substrate with concave portions for microlenses (second substrate) 22, a resin layer 14, microlenses 8, and spacers 9. The first and second substrates 21, 22 are manufactured according to the invention.

The first substrate 21 with concave portions for microlenses has a structure in which a plurality of first concave portions (concave portions for microlenses) 36 each having a concave curved surface (lens curved surface) and first alignment marks 42 are formed on a first glass substrate (first transparent substrate) 55.

The second substrate 22 with concave portions for microlenses has a structure in which a plurality of second concave portions (concave portions for microlenses) 37 each having a concave curved surface (lens curved surface) and second alignment marks 43 are formed on a second glass substrate (second transparent substrate) 56.

The microlens substrate 1 has a structure in which the first substrate 21 with concave portions for microlenses and the second substrate 22 with concave portions for microlenses are jointed via the resin layer 14 (adhesive layer) so as to have the first concave portions 36 and the second concave portions 37 face with each other. Further, in the microlens substrate 1, microlenses 8 constituted from biconvex lenses formed of resin filled within the volumes between the first concave portions 36 and the second concave portions 37 are provided between the first substrate 21 with concave portions for microlenses and the second substrate 22 with concave portions for microlenses.

The microlens substrate 1 has two kinds of regions, namely, an effective lens region 99 and an ineffective lens region 100. The effective lens region 99 is defined as the region where the microlenses 8 formed by the resin filled within the volumes between the first concave portions 36 and the second concave portions 37 function as microlenses effectively when used. On the other hand, the ineffective lens region 100 is defined as the region other than the effective region 99.

Such a microlens substrate 1 is used, for example, so that light L enters from the side of the first substrate 21 with concave portions for microlenses and exits from the side of the second substrate 22 with concave portions for microlenses.

The microlens substrate 1 can be manufactured, for example, as in the following way. Hereinafter, a method of manufacturing the microlens substrate 1 will be described with reference to FIGS. 14 and 15.

When the microlens substrate 1 is manufactured, the first substrate 21 with concave portions for microlenses and the second substrate 22 with concave portions for microlenses both of which are manufactured by means of the present invention are first prepared.

In this case, the structure (for example, the radius of curvature or the like) of the first concave portions 36 in the first substrate 21 with concave portions for microlenses may be different from the structure of the second concave portions 37 in the second substrate 22 with concave portions for microlenses.

Figure 14:
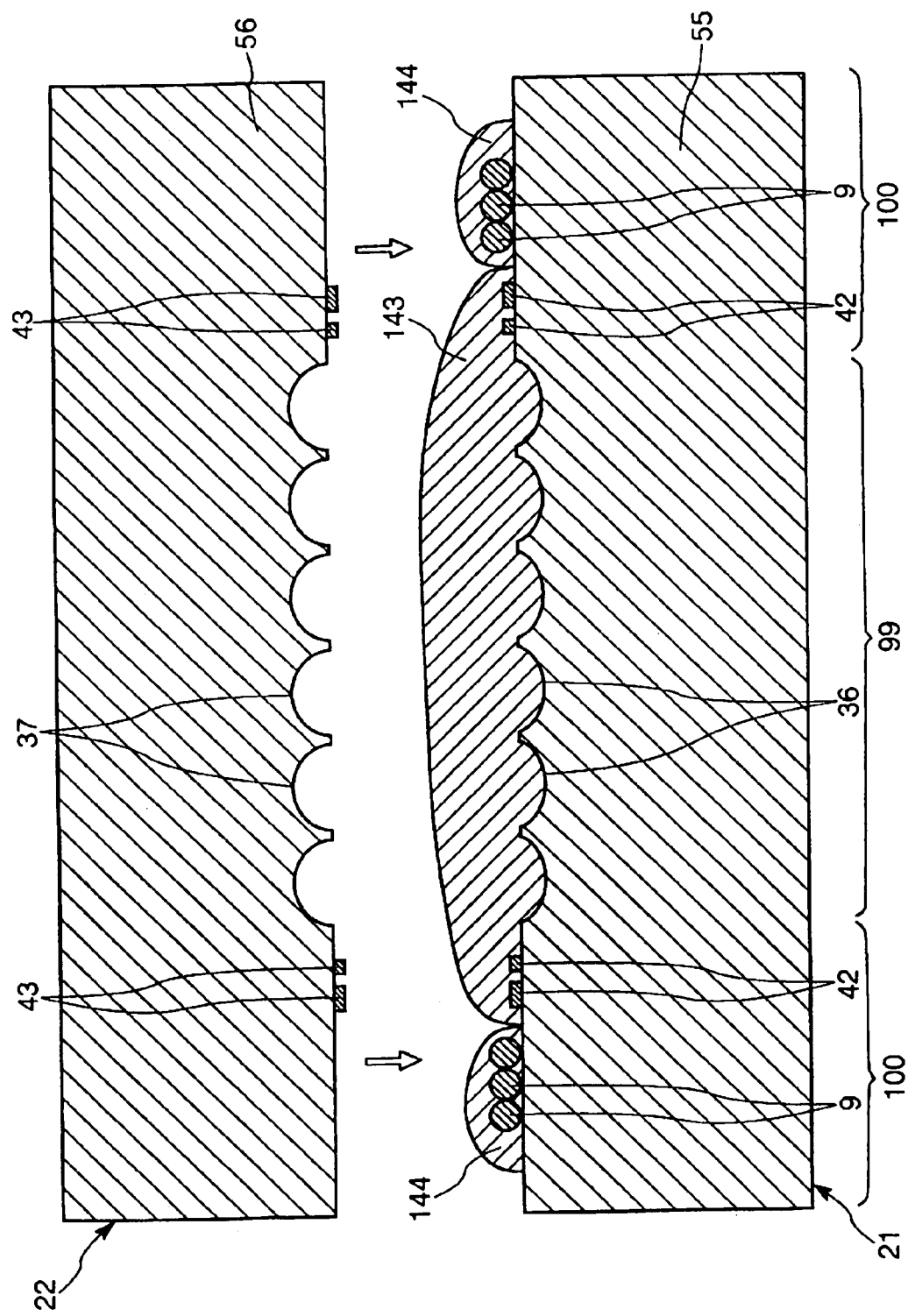
FIG. 14 is a schematic sectional view showing a method of manufacturing the microlens substrate according to the invention.

<D1> First, as shown in FIG. 14, uncured resin 143 having a predetermined index of refraction (in particular, the index of refractive higher than the index of refraction of each of a first glass substrate 55 and a second glass substrate 56) is supplied onto the surface where the first concave portions 36 of the first substrate 21 with concave portions for microlenses are formed so as to cover at least the effective lens region 99, whereby the resin 143 is filled into the first concave portions 36. At this time, uncured resin 144 including the spacers 9 is supplied onto the first substrate 21 with concave portions for microlenses. The resin 144 is supplied to the sites, for example, where the spacers 9 are to be set.

In this case, it is preferable that the resin 143 and the resin 144 are constituted from the same kind of material. Thus, occurrence of warp, deflection or the like in the manufactured microlens substrate due to the difference in the coefficient of thermal expansion between the resin 143 and the resin 144 can be prevented suitably.

When the resin 143 is supplied onto the first substrate 21 with concave portions for microlenses, it becomes easy to arrange the spacers 9 uniformly by having the spacers 9 dispersed in the resin 144. In this way, unevenness of the thickness of the formed resin layer 14 can be prevented satisfactorily.

Figure 15:
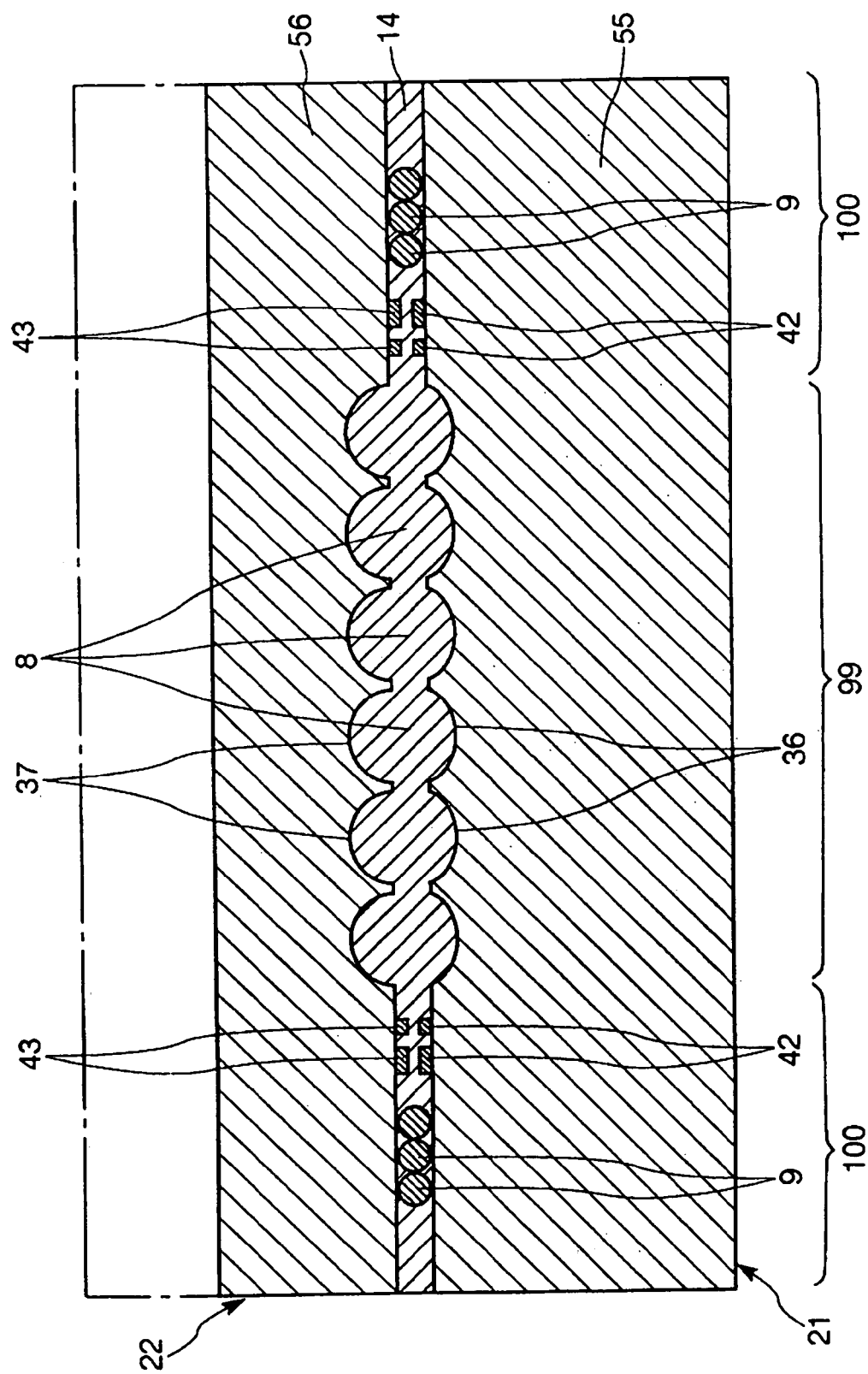
FIG. 15 is a schematic sectional view showing a method of manufacturing the microlens substrate according to the invention.

<D2> Next, as shown in FIG. 15, the second substrate 22 with concave portions for microlenses (i.e., counter element) is placed on the resin 143 and the resin 144 (namely, the second substrate 22 with concave portions for microlenses is closely contacted with the resins).

At this time, the second substrate 22 with concave portions for microlenses is placed on the resins 143 and 144 so as to make the first concave portions 36 and the second concave portions 37 face with each other correctly. Further, at this time, the second substrate 22 with concave portions for microlenses is placed on the resins 143 and 144 so that the substrate 22 abuts on the spacers 9. Thus, the distance between the mutually opposing end surfaces of the first substrate 21 with concave portions for microlenses and the second substrate 22 with concave portions for microlenses is defined by the spacers. Accordingly, the thickness at the end portions of the microlenses 8 and the maximum thickness of the microlenses 8 can be defined with high accuracy.

<D3> Next, the alignment between the first concave portions 36 and the second concave portions 37 are carried out using first alignment marks 42 and second alignment marks 43. Thus, the second concave portions 37 can be precisely positioned at positions corresponding to the first concave portions 36. Accordingly, the shape and optical properties of the formed microlenses 8 can be made closer to designed values.

<D4> Next, the resin layer 14 is formed by curing the resin 143 and the resin 144.

Thus, the second substrate 22 with concave portions for microlenses is bonded to the first substrate 21 with concave portions for microlenses via the resin layer 14. Further, the microlenses 8 are formed by the resin filled within the volumes between the first concave portions 36 and the second concave portions 37 in the resin constituting the resin layer 14. In this regard, the cure (curing) of the resin can be accomplished by irradiating the resin with ultraviolet or electron beam, heating the resin, or the like.

<D5> Then, the resin layer 14 with the formed microlenses 8 is separated from the first glass substrate 55 and the second glass substrate 56 to function as a screen. In addition, as shown in FIG. 15, the thickness of the second substrate 22 with concave portions for microlenses may be adjusted by means of grinding, polishing or the like if required.

As a result, the microlens substrate 1 provided with biconvex lenses as shown in FIG. 13, or a film of the resin layer 14 in which the microlenses 8 are formed can be obtained.

Although in the above description a glass substrate is used as the substrate 2 with concave portions for microlenses, the constituent material of the substrate 5 is not limited to glass in the present invention. A metal or resin, for example, may be used for the substrate 5. Further, although it is preferable that the substrate 5 is substantially transparent when it is made into a substrate with concave portions, a material with low transmittance may be used as the substrate 5, for example, in the case where the substrate 2 with concave portions for microlenses is used as a mold as in the 2P method.

Figure 16:
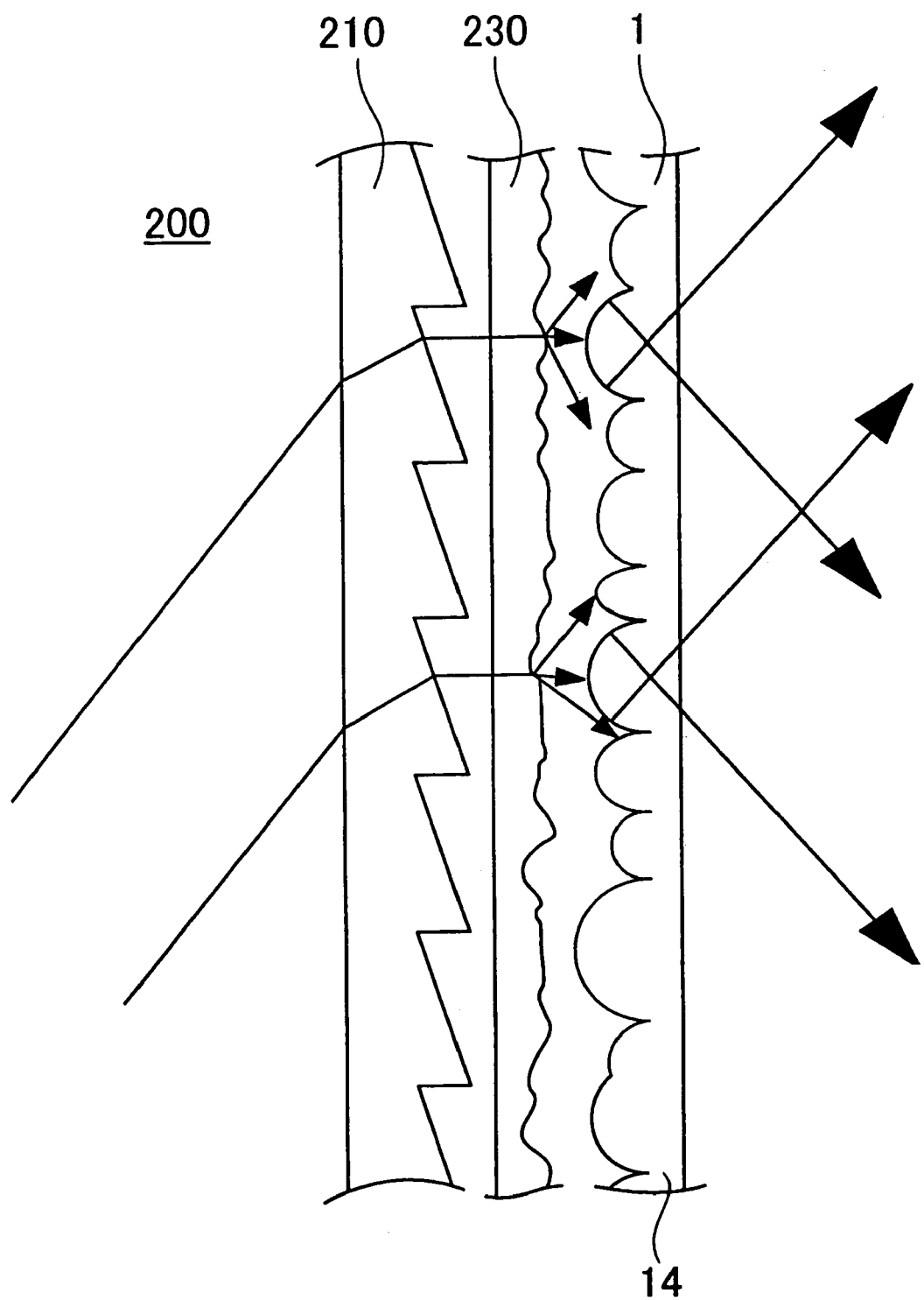
FIG. 16 is a sectional view schematically showing the optical system of a transmission screen according to the present invention.
Figure 17:
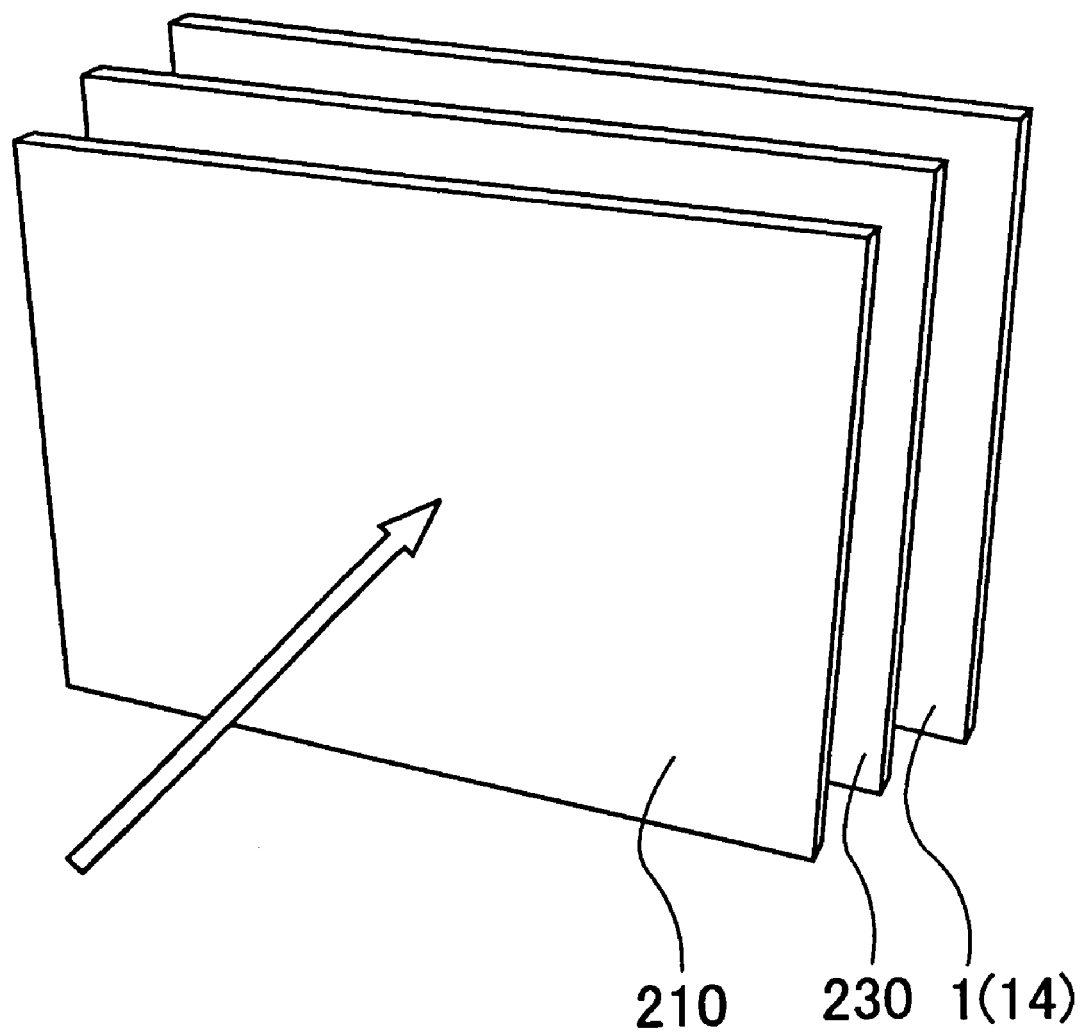
FIG. 17 is an exploded perspective view of the transmission screen shown in FIG. 16.

Next, a description will be given for a transmission screen using the microlens substrate 1 shown in FIG. 8 with reference to FIGS. 16 and 17. FIG. 16 is a sectional view schematically showing the optical system of a transmission screen according to the present invention. FIG. 17 is an exploded perspective view of the transmission screen shown in FIG. 16. Here, in FIG. 16, the microlens substrate 1 is shown in a simplified form, that is, in FIG. 16, only the resin layer 14 is shown as the microlens substrate 1, and the substrate 2 with concave portions for microlenses, the cover glass 13 and the like are omitted.

A transmission screen 200 comprises a Fresnel lens portion 210 with a Fresnel lens formed on the surface for emission face thereof, the microlens substrate 1 with a large number of microlenses 8 formed on the incident face side that is arranged on the emission face side of the Fresnel lens portion 210, and a light diffusion portion 230 arranged between the Fresnel lens portion 210 and the microlens substrate 1.

In this way, the transmission screen 200 has the microlens substrate 1, and therefore, the view angle in the vertical direction is wider than the case of using a lenticular lens.

Further, as the present embodiment, by arranging the light diffusion portion 230 between the Fresnel lens portion 210 and the microlens substrate 1, occurrence of diffracted light and moire can be prevented effectively. Namely, as shown in FIG. 16, by arranging the light diffusion portion 230 on the incident face side of the microlens substrate 1 the regularity (intensity, angle, phase, and the like) of light entered into each microlens 8 can be lowered, and the occurrence of diffracted light in the microlens substrate 1 can be prevented effectively.

Moreover, as shown in the drawing, by arranging the light diffusion portion 230 between the Fresnel lens portion 210 and the microlens substrate 1, light passing through the Fresnel lens is entered into the microlens substrate 1 after diffused by means of the light diffusion portion 230. As a result, occurrence of regular interference pattern can be prevented, and occurrence of moire in the Fresnel lens portion 210 and the microlens substrate 1 can be prevented effectively.

Furthermore, in the transmission screen 200 of the present embodiment, the light diffusion portion 230 is a so-called surface light diffusion type of resin sheet in which one of the surfaces is roughened (so that light is diffused substantially on the surface). Thus, since the light diffusion mechanism is exerted on the surface of the resin sheet, deterioration of the light diffusion mechanism can be prevented even if the thickness of the resin sheet is reduced. Therefore, the spacing between the Fresnel lens portion 210 and the microlens substrate 1 can be shortened, whereby the occurrence of ghost due to internal diffusion, deterioration in the contrast and the transmittance can be prevented. The resin sheet can be manufactured using, for example, a mold roughened by blast processing or the like, and by carrying out a method of transferring to the resin sheet by means of cast method or extrusion molding method. By manufacturing the resin sheet in such a method, it is possible to manufacture a light diffusion portion which can sufficiently prevent occurrence of diffracted light or moire using a relatively simple method.

It is preferable that the haze value (this value is represented by (Pd/Pa)×100, where Pd is the diffusion transmittance and Pa is the total transmittance) of the light diffusion portion 230 is in the range of 5 to 95%, more preferably in the range of 20 to 93%, and further more preferably in the range of 50 to 75%. By restricting the haze value of the light diffusion portion 230 in the above ranges, it is possible to sufficiently reduce (or lower) the regularity (intensity, angle, phase and the like) of light entered into each microlens 8. Therefore, this makes it possible to sufficiently prevent and suppress occurrence of turbidity or blurring in the image projected on the screen while sufficiently suppressing the occurrence of the diffracted light or moire.

Further, it is preferable that the glossiness of the light diffusion portion 230 is in the range of 5 to 40%, more preferably in the range of 10 to 35%, and further more preferably in the range of 15 to 30%. By restricting the glossiness of the light diffusion portion 230 in the above ranges, it is possible to sufficiently suppress the occurrence of regular interference pattern which is generated by overlapping the Fresnel lens portion 210 in which each lens is regularly arranged at regular intervals and the microlens substrate 1. Therefore, this makes it possible to sufficiently prevent and suppress the occurrence of feeling of surface roughness and blurring in the image projected on the screen while sufficiently preventing and suppressing the occurrence of diffracted light and moire. Here, the glossiness of the light diffusion portion 230 is defined as the value represented by the ratio (in %) of the amount of the reflected light to the amount of the incident light when the incident angle of the incident light is 60 degrees.

Moreover, it is preferable that the surface of the resin sheet constituting the light diffusion portion 230 has an irregularities comprised of roughly subulate concave portions. This makes it possible to prevent and suppress the occurrence of diffracted light or moire more effectively. Further, in the case where the surface of the resin sheet of the light diffusion portion 230 has the irregularities comprised of roughly subulate concave portions, it is preferable that the vertical interval in the roughly subulate concave portion is in the range of 5 to 200 μm. This makes it possible to prevent and suppress the occurrence of diffracted light and moire more effectively.

It is preferable that the diameter of the microlenses 8 in the microlens substrate 1 is in the range of 10 to 500 μm, and more preferably in the range of 30 to 300 μm, and further more preferably in the range of 100 to 200 μm. By restricting the diameter of the microlenses 8 in the above ranges, it is possible to further enhance the productivity of the transmission screen while maintaining sufficient resolution in the image projected on the screen. In this regard, it is preferable that the pitch between adjacent microlenses 8 in the microlens substrate 1 is in the range of 10 to 500 μm, more preferably in the range of 30 to 300 μm, and further more preferably in the range of 100 to 200 μm.

In particular, in the case where a substrate in which microlenses 8 are distributed randomly is used as the microlens substrate 1, interference with light valve for liquid crystal and the like or the Fresnel lens can be prevented more effectively, thereby making it possible to almost completely eliminate the occurrence of moire. As a result, a transmission screen with superior display quality can be obtained.

Further, according to the method as mentioned above, it is possible to manufacture a large-sized microlens substrate 1 easily. Therefore, it is possible to manufacture a large-sized screen with high quality and free from the bonding seams.

It is to be noted that the transmission screen according to the present invention is not limited to the structure as described above. For example, transmission screen further comprising a black matrix, black stripes, light diffusion plate or another microlens on the emission face side of the microlens substrate 1 may be provided.

Hereinafter, a description will be given for a rear projector using the transmission screen.

Figure 18:
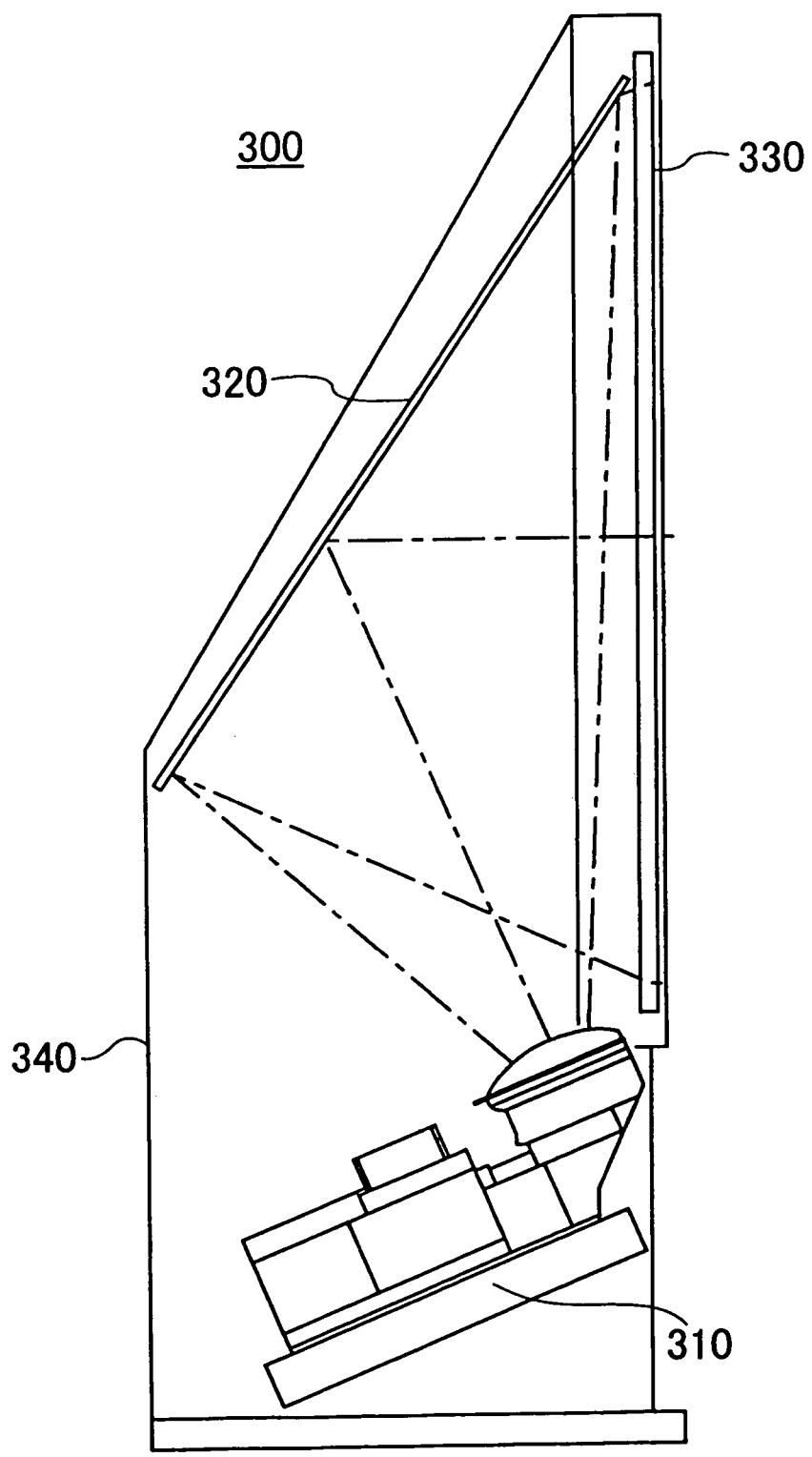
FIG. 18 is a diagram schematically showing a structure of the rear projector according to this invention.

FIG. 18 is a diagram schematically showing a structure of the rear projector according to the present invention.

As shown in the drawing, a rear projector 300 has a structure in which a projection optical unit 310, a light guiding mirror 320 and a transmission screen 330 are arranged in a casing 340.

Since the rear projector 300 uses the transmission screen 200 which hardly generates diffracted light or moire as described above as its transmission screen 330, it forms an excellent rear projector with high display quality, which has a wide view angle and free from occurrence of moire.

As described above, in the present invention, since the initial holes are formed in the mask by means of a physical method or irradiation with laser beams, it is possible to form openings (i.e., initial holes) of a predetermined pattern in the mask in a manner easier than the conventional method of forming openings in the mask by photolithography method. As a result, productivity can be improved, and the substrate with concave portions can be provided at a lower cost.

Further, since the processing to a large-sized substrate can be facilitated according to the invention, there is no need for bonding a plurality of substrate as in the conventional method when a large-sized substrate is manufactured, thereby being capable of eliminating the appearance of the bonding seams. As a result, a large-sized substrate with concave portions having a high quality can be manufactured by means of a simple method at a low cost.

Accordingly, for example, a substrate with concave portions for a large-sized microlens, a microlens substrate, a transmission screen and a rear projector, each having high quality, can be manufactured by means of a simplified method at a lower cost.

As described above, it should be noted that, even though the method of manufacturing the substrate with concave portions, the substrate with concave portions, the substrate with concave portions for microlenses, the microlens substrate, the transmission screen and the rear projector according to the present invention have been described with reference to the preferred embodiments shown in the accompanying drawings, the present invention is not limited to these embodiments.

For example, in the method of manufacturing the substrate with concave portions according to the invention, processes of arbitrary objects may be added if necessary.

Further, in the initial hole formation process in the above description, the structure in which shot blast is carried out while moving the nozzle 610 one-dimensionally (in a linear manner) has been described. However, the blast processing may be carried out while moving the nozzle 610 two-dimensionally (in a planar manner) or three-dimensionally (in a spatial manner).

Moreover, the transmission screen and the rear projector according to the invention are not limited to the type as described in the embodiments, and each element constituting the transmission screen and the rear projector may be replaced with one capable of performing the same or a similar function. For example, the transmission screen of the invention may be a transmission screen further including black stripes, a light diffusion plate or any other microlens substrate on the emission face side of the microlens substrate 1. Furthermore, although the structure in which a resin sheet is provided as the light diffusion portion has been described in the embodiments, the light diffusion portion may be one, for example, formed by subjecting roughening processing or the like to the surface opposite to the surface where the concave portions of the substrate with concave portions for microlenses are formed. In other words, the light diffusion portion may be one formed integrally with the substrate with concave portions for microlenses (microlens substrate).

Further, the screen (transmission screen) or the rear projector of the invention may be one different from the type which has the light diffusion portion as in the embodiment as described above. In particular, in the case where the screen or the rear projector has a microlens substrate with randomly distributed microlenses, the occurrence of interference fringes or the like can be prevented effectively even though the screen or the rear projector has no light diffusion portion described above.

Moreover, in the above description, the cases of applying the microlens substrate of the invention to the transmission screen and the projection display provided with the transmission screen have been described as the examples, but the present invention is not limited to these cases. For example, needless to say, the microlens substrate of the invention may be applied to a CCD, various kinds of electrooptical devices such as an optical communication device, a liquid crystal display (liquid crystal panel), an organic or inorganic electroluminescent (EL) display and other devices.

In addition, the display is also not limited to the display for the rear projector, and the microlens substrate of the invention can be applied, for example, to a front projection type display.

Furthermore, the case of applying the substrate with concave portions of the invention to the substrate with concave portions for microlenses has been described as an example, the present invention is not limited to this case, and the substrate with concave portions of the invention can be applied, for example, to a reflector (reflection plate) in various kinds of light emission sources such as an organic EL device, a reflector for reflecting light from a light source, a light diffusion plate for diffusing light from a light emission source, or the like.

EXAMPLE

Example 1

A substrate with concave portions for microlenses equipped with concave portions for microlenses was manufactured, and then a microlens substrate was manufactured using the substrate with concave portions for microlenses in the following manner.

First, an alkali-free glass substrate having a rectangle of 1.2 m×0.7 m and a thickness of 5 mm was prepared.

The substrate of alkali-free glass was soaked in cleaning liquid (i.e., 4 wt % aqueous solution (containing a small amount of hydrogen peroxide solution) of ammonium hydrogen difluoride) heated to 30° C. to be washed, thereby cleaning its surface.

-1A- Next, films (a mask and a rear face protective film) each having a thickness of 0.2 μm comprising chromium oxide and chromium (Cr) were formed on the alkali-free glass substrate by means of a sputtering method.

-2A- Next, shot blast was carried out to the mask to form a large number of initial holes within a region of 113 cm×65 cm at the central part of the mask.

Here, the shot blast was carried out under the conditions of a blast pressure of 4 kg/cm$^2$ and a spraying density of 40 kg/m$^2$ using glass beads of average grain diameter of 100 μm as blast media.

In this way, the initial holes were formed in a random pattern over the entire region of the mask mentioned above. The average diameter of the initial holes was 10 μm, and the formation density of the initial holes was 20,000 holes/cm$^2$.

In addition, at this time, initial concave portions with depth of about 0.05 μm were formed on the surface of the alkali-free glass substrate.

-3A- Next, the alkali-free glass substrate was subjected to wet etching process, thereby forming a large number of concave portions on the alkali-free glass substrate.

In this regard, 4 wt % aqueous solution (containing a small amount of hydrogen peroxide solution) of ammonium hydrogen difluoride was used for the wet etching, and the soak time of the substrate was 5 hours.

-4A- Next, the films comprising chromium oxide and chromium (mask and rear face protective film) were removed by carrying out an etching process using a mixture of ceric nitrate, ammonium and perchloric acid.

As a result, a wafer-like substrate with concave portions for microlenses where a large number of concave portions for microlenses were randomly formed on the alkali-free glass substrate was obtained.

-5A- Next, a plate glass was bonded to the surface on which the concave portions of the substrate with concave portions for microlenses were formed using an ultraviolet-ray (UV) curing resin (with index of refraction of 1.59).

Then, the plate glass was peeled off.

At the same time, as a result of the above, microlenses constituted from the resin filled in the concave portions of the substrate with concave portions for microlenses were formed.

In this way, a microlens substrate with an area of 1.2 m×0.7 m on which a large number of microlenses are randomly formed was obtained. The average diameter of the formed microlenses was 100 μm.

Example 2

First, an alkali-free glass substrate having a rectangle of 1.2 m×0.7 m and a thickness of 5 mm was prepared.

The substrate of alkali-free glass was soaked in cleaning liquid (i.e., 4 wt % aqueous solution (containing a small amount of hydrogen peroxide solution) of ammonium hydrogen difluoride) heated to 30° C. to be washed, thereby cleaning its surface.

-1B- Next, silicon films (a mask and a rear face protective film) each having a thickness of 0.3 μm were formed on the alkali-free substrate by means of a CVD method.

-2B- Next, laser machining was carried out to the mask to form a large number of initial holes within a region of 113 cm×65 cm at the central part of the mask.

In this regard, the laser machining was carried out using second harmonic of YAG laser under the condition of 2 mW.

In this way, the initial holes were formed in a random pattern over the entire region of the region of the mask mentioned above. The average diameter of the initial holes was 8 μm, and the formation density of the initial holes was 5,000 holes/cm$^2$.

In addition, at this time, initial concave portions with depth of about 0.03 μm were formed on the surface of the alkali-free glass substrate.

-3B- Next, the alkali-free glass substrate was subjected to wet etching process, thereby forming a large number of concave portions on the alkali-free glass substrate.

In this regard, 4 wt % aqueous solution (containing a small amount of hydrogen peroxide solution at normal temperature) of ammonium hydrogen difluoride was used for the wet etching, and the soak time of the substrate was 5 hours.

-4B- Next, the alkali-free glass substrate was soaked in 12.5 wt % aqueous solution of tetramethyl ammonium hydroxide (TMAH) heated to 50° C. for 30 minutes to remove the silicon films (a mask and a rear face protective film).

As a result, a wafer-like substrate with concave portions for microlenses where a large number of concave portions for microlenses were randomly formed on the alkali-free glass substrate was obtained.

Then, the -5A- process mentioned above was carried out, and a microlens substrate with an area of 1.2 m×0.7m on which a large number of microlenses were randomly formed was obtained similar to Example 1. The average diameter of the formed microlenses was 100 μm.

Example 3

First, an alkali-free glass substrate having a rectangle of 1.2 m×0.7 m and a thickness of 5 mm was prepared.

The substrate of alkali-free glass was soaked in cleaning liquid (i.e., 4 wt % aqueous solution (containing a small amount of hydrogen peroxide solution) of ammonium hydrogen difluoride) heated to 30° C. to be washed, thereby cleaning its surface.

-1C- Next, films (a mask and a rear face protective film) constituted from a Cr layer and an Au layer (Cr—Au film) were formed on the alkali-free glass substrate by means of a CVD method. The thickness of the Cr layer was 0.01 μm, and the thickness of the Au layer was 0.2 μm.

-2C- Next, shot blast was carried out to the mask to form a large number of initial holes within a region of 113 cm×65 cm at the central part of the mask.

Here, the shot blast was carried out under the conditions of a blast pressure of 4 kg/cm$^2$ and a spraying density of 40 kg/m$^2$ using glass beads of average grain diameter of 100 μm as blast media.

In this way, the initial holes were formed in a random pattern over the entire region of the mask mentioned above. The average diameter of the initial holes was 10 μm, and the formation density of the initial holes was 20,000 holes/cm$^2$.

In addition, at this time, initial concave portions with depth of about 0.05 μm were formed on the surface of the alkali-free glass substrate.

-3C- Next, the alkali-free glass substrate was subjected to wet etching process, thereby forming a large number of concave portions on the alkali-free glass substrate.

In this regard, 4 wt % aqueous solution (containing a small amount of hydrogen peroxide solution) of ammonium hydrogen difluoride was used for the wet etching, and the soak time of the substrate was 5 hours.

-4C- Next, the Cr—Au films (the mask and the rear face protective film) were removed by carrying out an etching process using a mixture of ceric nitrate and ammonium, and an aqueous solution of iodine and potassium iodide.

As a result, a wafer-like substrate with concave portions for microlenses where a large number of concave portions for microlenses were randomly formed on the alkali-free glass substrate was obtained.

-5C- Next, a plate glass was bonded to the surface on which the concave portions of the substrate with concave portions for microlenses were formed using an ultraviolet-ray (UV) curing resin (with index of refraction of 1.59).

Then, the plate glass was peeled off.

At the same time, as a result of the above, microlenses constituted from the resin filled in the concave portions of the substrate with concave portions for microlenses were formed.

In this way, a microlens substrate with an area of 1.2 m×0.7 m on which a large number of microlenses are randomly formed was obtained. The average diameter of the formed microlenses was 100 μm.

Comparative Example

First, a quartz glass substrate with thickness of 1 mm was prepared.

The quartz glass substrate was soaked in a cleaning liquid (i.e., mixture of 80% sulfuric acid and 20% hydrogen peroxide solution) heated to 85° C. to be washed, thereby cleaning its surface.

-1D- Next, the quartz glass substrate was placed in a CVD furnace set at 600° C. and 80 Pa, SiH$_4$ gas was supplied into the CVD furnace at a rate of 300 mL/minute, whereby polycrystalline silicon films (a mask and a rear face protective film) with thickness of 0.6 μm was formed by means of a CVD method.

-2D- Next, a resist having a regular pattern of microlenses was formed on the formed polycrystalline silicon film (mask) by means of a photolithography method, and then, a dry etching process was carried out to the polycrystalline silicon film (mask) to using CF gas. Then, openings were formed in the polycrystalline silicon film (mask) by removing the resist.

-3D- Next, a large number of concave portions were formed on the quartz glass substrate by subjecting the quartz glass substrate to a first wet etching process.

In this process, a hydrofluoric-based etching liquid was used as an etchant.

-4D- Next, the polycrystalline silicon films (the mask and the rear face protective film) were removed by means of a dry etching process using CF gas.

In this way, a wafer-like substrate with concave portions for microlenses in which a large number of concave portions for microlenses were regularly formed on the quartz glass substrate was obtained.

Then, the -5A- process mentioned above was carried out, and a microlens substrate on which a large number of microlenses were regularly formed was obtained similar to Example 1. The average diameter of the formed microlenses was 100 μm.

(Evaluation)

In Example 1 to 3 in which openings (initial holes) were formed by means of a physical method or irradiation with laser beams, a processing for a large-sized substrate such as 1.2 m×0.7 m could be implemented easily. On the other hand, in the comparative example in which the openings were formed in the mask by a photolithography method, it was difficult to implement processing for a large-sized substrate such as 1.2 m×0.7 m. In particular, since numerous defective products were generated in the photoresist process, the yield was extremely inferior.

Using the microlens substrate obtained by Examples 1 to 3, transmission screens as shown in FIGS. 16 and 17 were manufactured, and the rear projectors as shown in FIG. 18 were manufactured using the screen. In each of the rear projectors obtained, the surface of the light diffusion portion had an irregularities comprised of roughly subulate concave portions, and the haze value and the glossiness of the light diffusion portion were 50% and 20%, respectively. In addition, the average vertical interval (average height difference) in the roughly subulate concave portion formed on the surface of the light diffusion portion was 50 μm.

When an image was projected onto each screen of the rear projectors obtained, a bright image could be displayed. Further, it was confirmed that occurrence of diffracted light or moire was satisfactorily prevented in the rear projectors using the microlens substrate according to Examples 1 to 3.

Accordingly, it is readily conjectured that a projection display using such a transmission screen is capable of projecting a bright image of high quality on the screen.

Japanese patent application No. 2003-019589 filed Jan. 28, 2003 and Japanese patent application No. 2003-144083 filed May 21, 2003 are hereby incorporated by reference.

The invention claimed is:

1. A method of manufacturing a substrate with a plurality of concave portions, the method comprising the steps of:
    preparing a substrate;
    forming a first mask on the substrate;
    forming a plurality of first initial holes in the first mask by one of a physical method and irradiation with laser beams;
    forming a plurality of first concave portions in the substrate by subjecting the substrate provided with the first mask having the plurality of first initial holes therein to a first etching process;
    removing the first mask after the first etching process;
    forming a second mask on the substrate in which the plurality of first concave portions have already been formed;
    forming a plurality of second initial holes in the second mask by one of the physical method and irradiation with laser beams;
    forming a plurality of second concave portions in the substrate by subjecting the substrate provided with the second mask having the plurality of second initial holes therein to a second etching process; and
    removing the second mask after the second etching process;
    wherein the plurality of concave portions include the plurality of first concave portions and the plurality of second concave portions.

2. The method as claimed in claim 1, wherein each of the first and second masks comprises Cr or chromium oxide as a main component.

3. The method as claimed in claim 1, wherein an average thickness of each of the first and second masks is in a range of 0.05 to 2.0 μm.

4. The method as claimed in claim 1, wherein each of the first and second etching processes includes a wet etching process using at least one of ammonium hydrogen difluoride and ammonium fluoride as an etchant.

5. The method as claimed in claim 1, wherein the first concave portions and the second concave portions are randomly arranged on the substrate.

6. The method as claimed in claim 1, wherein the substrate comprises alkali-free glass.

7. The method as claimed in claim 1, wherein the plurality of first and second concave portions are shaped for manufacturing microlenses.

8. The method as claimed in claim 1, wherein the physical method includes blast processing.

9. The method as claimed in claim 8, wherein the blast processing employs glass beads as blast media.

10. The method as claimed in claim 8, wherein the blast processing employs a blast media having an average diameter in a range of 20 to 200 μm.

11. The method as claimed in claim 8, wherein the blast processing comprises spraying blast media with the blast pressure in a range of 1 to 10 $kg/cm^2$.

12. The method as claimed in claim 8, wherein the blast processing comprises spraying blast media with a blast density in a range of 10 to 100 $kg/m^2$.

13. The method as claimed in claim 1, wherein the step of forming the first concave portions is performed under first conditions and the step of forming the second concave portions is performed under second conditions, the first conditions being different from the second conditions.

14. The method as claimed in claim 13, wherein a size of the first initial holes is different from a size of the second initial holes.

15. The method as claimed in claim 13, wherein a side-etching rate of the first etching process is different from a side-etching rate of the second etching process.

* * * * *